(12) United States Patent
Hill et al.

(10) Patent No.: US 10,513,463 B2
(45) Date of Patent: Dec. 24, 2019

(54) ENHANCED FRACTURE TOUGHNESS THERMAL BARRIER COATING MATERIAL

(71) Applicant: SKYWORKS SOLUTIONS, INC., Woburn, MA (US)

(72) Inventors: Michael David Hill, Frederick, MD (US); Jeffrey Alan Shunkwiler, Frederick, MD (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 15/716,309

(22) Filed: Sep. 26, 2017

(65) Prior Publication Data

US 2018/0086672 A1 Mar. 29, 2018

Related U.S. Application Data

(60) Provisional application No. 62/400,305, filed on Sep. 27, 2016.

(51) Int. Cl.
| | |
|---|---|
| *C04B 35/48* | (2006.01) |
| *C04B 35/486* | (2006.01) |
| *C04B 35/50* | (2006.01) |
| *C04B 35/49* | (2006.01) |
| *C04B 35/488* | (2006.01) |
| *C23C 28/00* | (2006.01) |

(Continued)

(52) U.S. Cl.
CPC ............ *C04B 35/48* (2013.01); *C04B 35/488* (2013.01); *C04B 35/49* (2013.01); *C23C 4/11* (2016.01); *C23C 28/32* (2013.01); *C23C 28/345* (2013.01); *C23C 28/3455* (2013.01); *C04B 2235/3208* (2013.01); *C04B 2235/3212* (2013.01); *C04B 2235/3217* (2013.01); *C04B 2235/3222* (2013.01); *C04B 2235/3224* (2013.01); *C04B 2235/3225* (2013.01); *C04B 2235/3232* (2013.01); *C04B 2235/3241* (2013.01); *C04B 2235/3248* (2013.01); *C04B 2235/765* (2013.01); *C04B 2235/80* (2013.01); *C04B 2235/9669* (2013.01); *F01D 25/007* (2013.01); *F05D 2220/323* (2013.01); *F05D 2230/90* (2013.01); *Y02T 50/6765* (2018.05)

(58) Field of Classification Search
CPC ... C04B 35/48; C04B 35/488; C04B 35/4885; C04B 35/50
See application file for complete search history.

(56) References Cited

U.S. PATENT DOCUMENTS

| | | | |
|---|---|---|---|
| 4,886,768 | A | 12/1989 | Tien |
| 5,008,221 | A | 4/1991 | Ketcham |

(Continued)

FOREIGN PATENT DOCUMENTS

| | | | |
|---|---|---|---|
| JP | 2002121070 A | * | 4/2002 |
| SU | 414234 | * | 5/1974 |

*Primary Examiner* — Karl E Group
(74) *Attorney, Agent, or Firm* — Knobbe Martens Olson and Bear, LLP

(57) ABSTRACT

Disclosed are embodiments of a multi-phase ceramic material which can have advantageous properties as a thermal barrier coating. In particular, embodiments of the ceramic can have high fracture toughness as well as calcium, magnesium, and aluminum silicate corrosion resistance. The improved properties of the ceramic can make the material applicable as a coating on turbines, such as airplane and industrial turbines.

20 Claims, 23 Drawing Sheets

(51) Int. Cl.
*C23C 4/11* (2016.01)
*F01D 25/00* (2006.01)

(56) References Cited

U.S. PATENT DOCUMENTS

| | | |
|---|---|---|
| 6,007,926 A | 12/1999 | Provenzano et al. |
| 6,380,113 B1 | 4/2002 | Kim |
| 6,602,814 B1 | 8/2003 | Gadow et al. |
| 7,399,722 B2 | 7/2008 | Shikata et al. |
| 7,618,911 B2 | 11/2009 | Pacht et al. |
| 7,723,249 B2 | 5/2010 | Doesburg |
| 9,988,309 B2 * | 6/2018 | Hill .................. C04B 35/44 |
| 2009/0292366 A1 * | 11/2009 | Burger ............. C04B 35/4885 623/23.56 |
| 2009/0317767 A1 * | 12/2009 | Burger ............. C04B 35/4885 433/201.1 |
| 2012/0082849 A1 | 4/2012 | Nonnet et al. |
| 2014/0220378 A1 * | 8/2014 | Nagaraj ................. C23C 4/18 428/623 |
| 2015/0259251 A1 * | 9/2015 | Hill .................. C04B 35/44 252/62 |

* cited by examiner

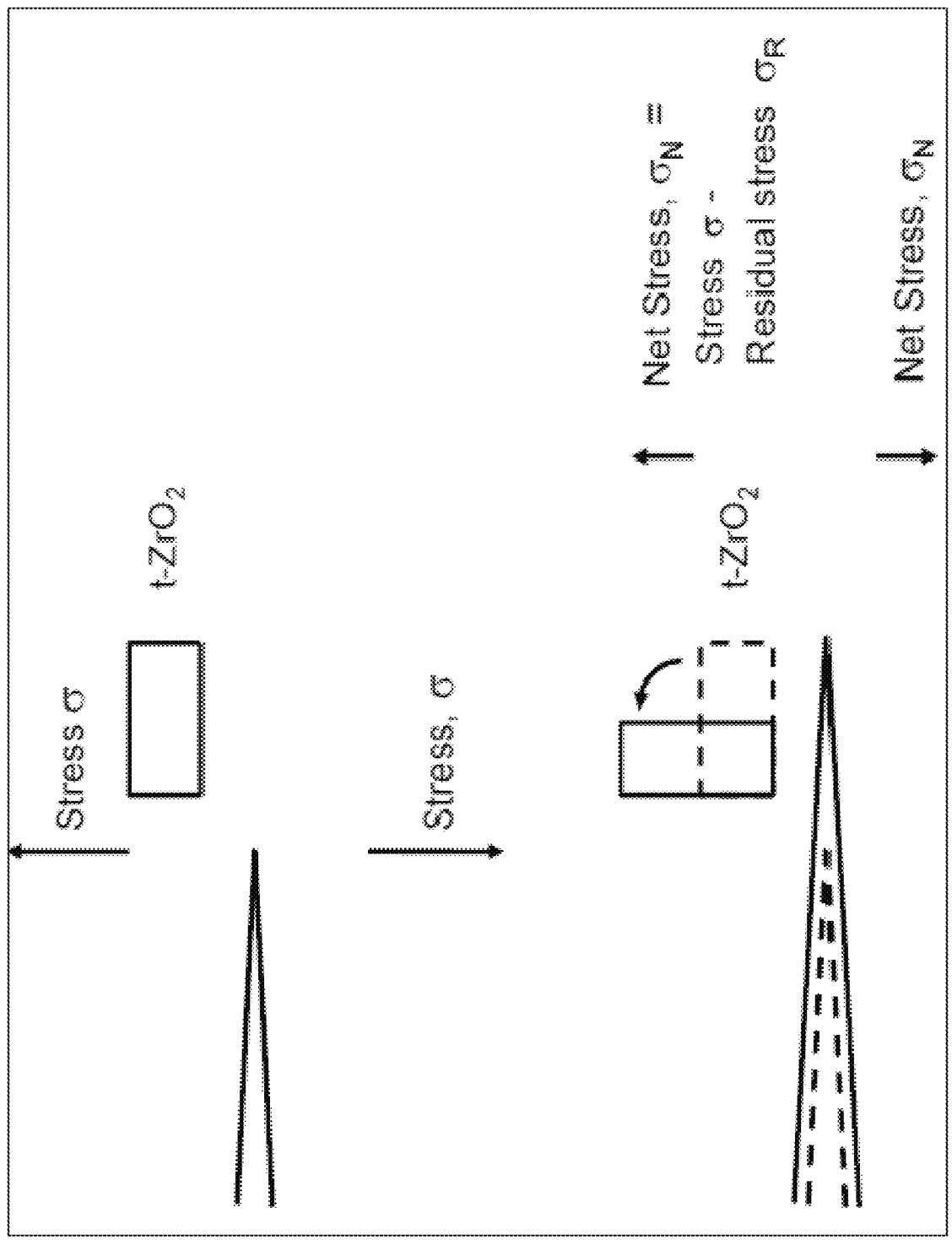

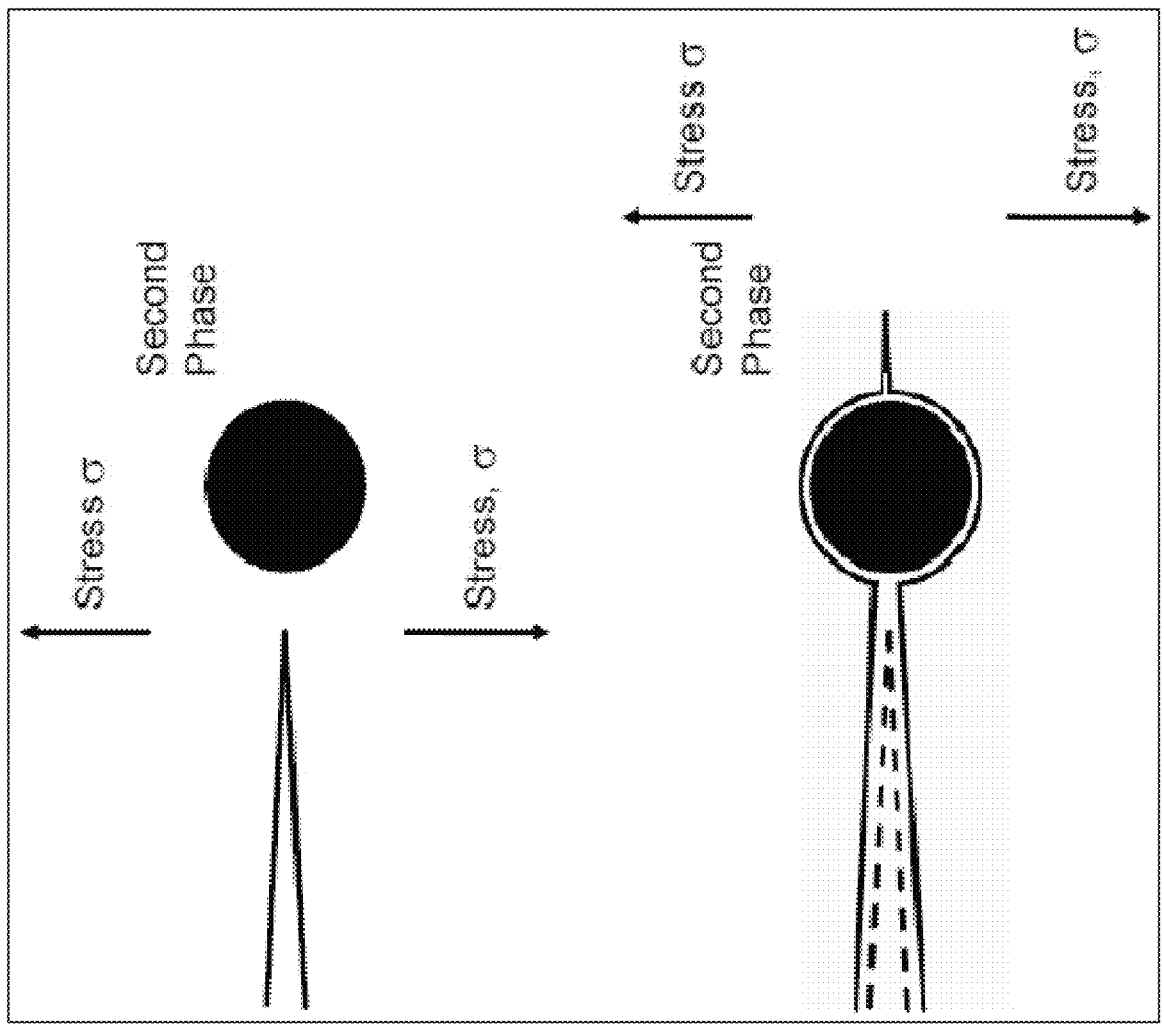

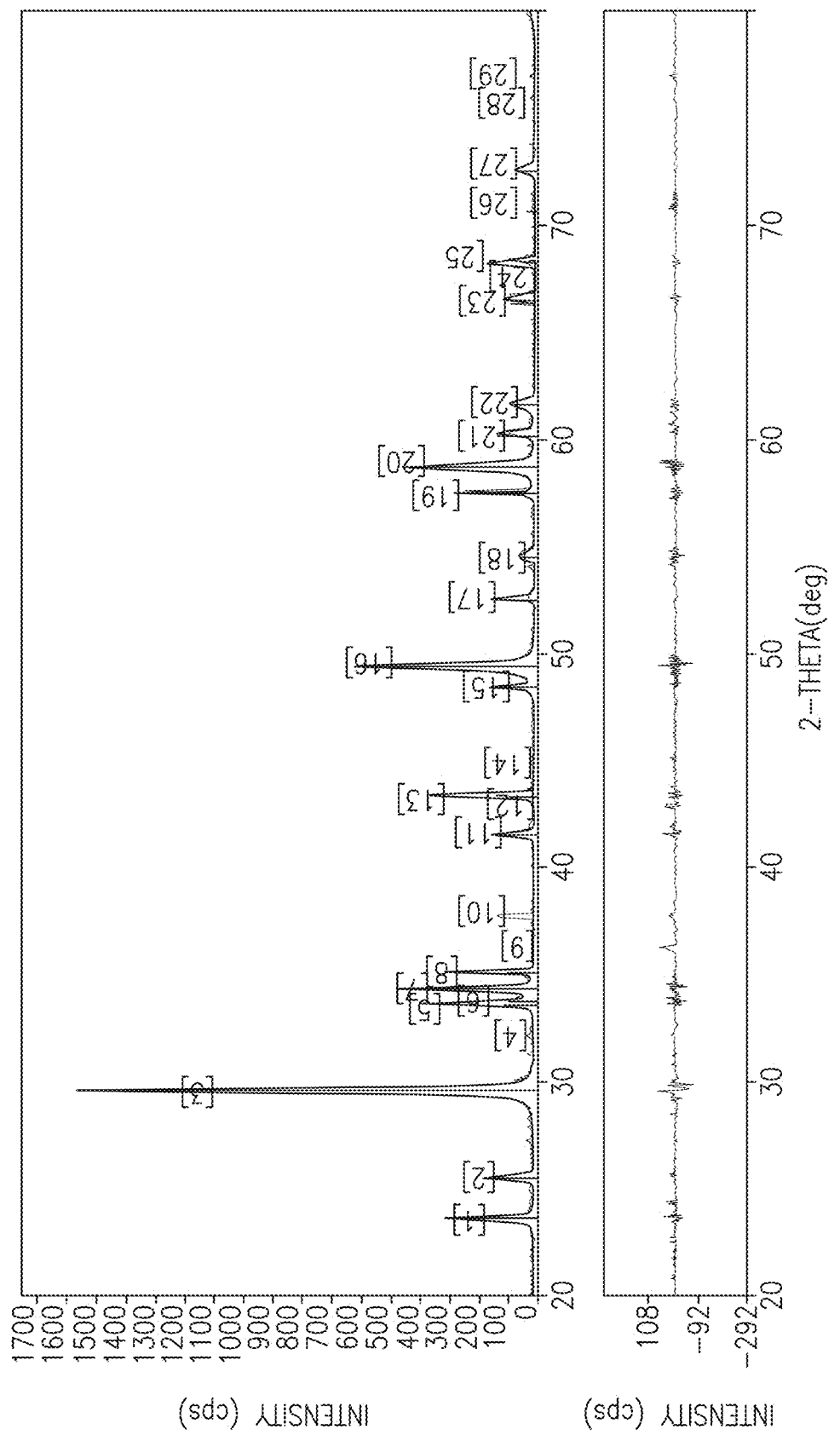

ENHANCED FRACTURE TOUGHNESS THERMAL BARRIER COATING MATERIAL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the disclosure relate generally to ceramic materials and, in particular, to ceramics having improved corrosion resistance and impact damage.

Description of the Related Art

Gas turbine engines are a class of internal combustion engine commonly employed in power generation and aviation applications. In these engines, air enters the engine and is compressed to high pressure. The pressurized air is channeled through a combustion chamber, where a fuel is burned to produce heat. As a result, the temperature of the pressurized air is increased to an engine operating temperature, resulting in an increase in its velocity. This hot, high velocity, pressurized air is subsequently directed at a turbine, which extracts mechanical energy from the air by spinning. Depending upon the application, the spinning turbine may be employed to generate electrical power (e.g., gas-turbine generators) or to generate thrust/lift for aircraft (e.g., turbojet and turbofan engines).

In general, the thermal efficiency of gas turbine engine (the ratio of work output to heat input) is related to the difference between the temperature of the relatively cold input gas and the relatively hot, pressurized gas. That is, as the temperature difference between the intake air and the air at the engine operating temperature increases, so does the thermal efficiency of the engine (i.e., the more work is done for a given amount of input heat). Based upon this consideration, higher operating temperatures are favored, based purely on thermodynamic considerations.

In practical terms, though, the operating temperature of gas turbine engines, and therefore the thermal efficiency of the engine, is limited by the uppermost use temperature of materials forming the hot zone components of the gas-turbine engine (e.g., turbine blades, combustor liners, combustor shrouds, etc.). Traditionally, hot zone components have been formed from superalloys which possess high mechanical strength, creep resistance (resistance to time-dependent deformation under stress), and resistance to chemical attack (e.g., oxidation, corrosion, etc.), among other considerations. For example, modern superalloys can operate at temperatures up to approximately 1100° C.

To increase the temperature capability of superalloys in use, thermal barrier coatings may be applied to superalloy surfaces. For example, FIG. 1 presents a schematic illustration of a layered thermal barrier coating (TBC) system deposited upon a substrate such as the superalloy. The system can include a bond coat layer and a ceramic TBC layer (other layers may also be present but are omitted for simplicity). The bond coat can be applied to the substrate. In FIG. 1, the left surface of the substrate is assumed to be adjacent to a flow of cooling air and the right surface of the thermal barrier coating is assumed to be adjacent to a flow of hot gases. Accordingly, on the substrate side, the bond coat can protect the substrate against oxidation and corrosion. On the TBC side, the bond coat can provide adhesion to the TBC layer.

FIG. 1 further presents a schematic representation of temperature within the substrate, bond coat, and TBC during engine operation as a function of position (dashed line). For example, the TBC layer may thermally insulate the underlying superalloy from the operating temperature of the gas turbine engine (e.g., the hot gas temperature) and sustain a significant temperature difference between the load-bearing superalloy and the TBC surface. For example, air-cooled superalloy turbine blades including a protective TBC may be used at temperatures as high as about 200° C. above the melting temperature of the superalloy.

TBCs may undergo failure due to a number of different mechanisms. For example, foreign objects may enter the engine and impact on the TBC surface. When the foreign objects are relatively small (e.g., dust, etc.), such impacts may result in erosion of the TBC over time. Alternatively, when the foreign objects are larger (rocks, tools, etc.), such impacts may result in impact damage such as cracks, which can grow and lead to spallation of the TBC.

SUMMARY

Disclosed herein are embodiments of a ceramic material resistant to fracturing and corrosion, the ceramic material comprising a first phase, the first phase being tetragonally stabilized zirconia or hafnia, a second phase, the second phase being a magnetoplumbite structure; and a third phase, the third phase being alumina.

In some embodiments, the magnetoplumbite structure can include an aluminum based oxide. In some embodiments, the aluminum based oxide can be an aluminum neodymium oxide. In some embodiments, the third phase can react with molten silicates. In some embodiments, the ceramic material can be calcium, magnesium, and aluminum silicate corrosion resistant. In some embodiments, the stabilized zirconia or hafnia can be stabilized by yttrium.

In some embodiments, the second and third phase can increase the crack resistance of the ceramic material through crack bridging. In some embodiments, the material can further include chromium in the ceramic material. In some embodiments, the alumina may not be layered on the first phase or the second phase. In some embodiments, the ceramic material can further include apatite.

Also disclosed herein are embodiments of a method of forming a thermal barrier coating, the method comprising providing a ceramic powder, and spraying or depositing the ceramic powder to form the thermal barrier coating, the coating including a first phase of tetragonally stabilized zirconia or hafnia, a second phase of a magnetoplumbite structure, and a third phase of alumina.

In some embodiments, the spraying or depositing can include spray or deposit coating a turbine with the powder. In some embodiments, wherein the method further includes spraying or depositing a bonding coat. In some embodiments, the spraying or depositing can include plasma spray, high velocity oxygen fuel spray, electron-beam physical vapor deposition, electrostatic spray assisted vapor deposition, or direct vapor deposition. In some embodiments, the magnetoplumbite structure can be an aluminum neodymium oxide.

Also disclosed herein are embodiments of a turbine resistant to fracturing and corrosion, the turbine having a coating comprising a first phase, the first phase being tetragonally stabilized zirconia or hafnia, a second phase, the second phase being a magnetoplumbite structure, and a third phase, the third phase being alumina.

In some embodiments, the turbine can be an aircraft turbine. In some embodiments, the turbine can be an industrial gas turbine.

In some embodiments, the magnetoplumbite structure can include an aluminum based oxide. In some embodiments, the third phase can react with molten silicates. In some embodiments, the stabilized zirconia or hafnia can be stabilized by yttrium.

BRIEF DESCRIPTION OF THE DRAWINGS

FIGS. 4A-4B are schematic illustrations of a ferroelastic toughening mechanism.

FIGS. 5A-5B are schematic illustrations of a crack bridging toughening mechanism.

FIGS. 8A-13B illustrate X-ray diffraction results for embodiments of the disclosure.

DETAILED DESCRIPTION

Embodiments of the disclosure are ceramic materials which have improved resistance to corrosion, erosion, and impact damage. In particular, the ceramic materials can be multi-phase ceramics and can be particular advantageous as a thermal barrier coating, for example due to their corrosion resistance and impact resistance. The disclosed material may be particularly advantageous for to calcium, magnesium, and aluminum silicate (CMAS) corrosion resistance. Embodiments of the disclosed ceramic materials may be applied as a coating on many different substrates, such as engines.

Figure 1:
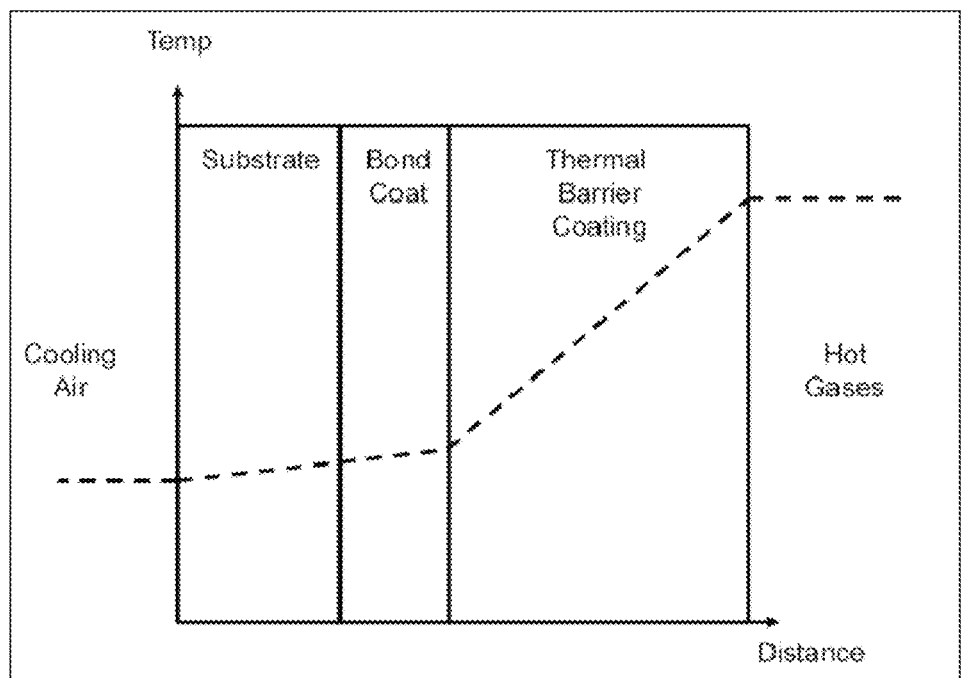
FIG. 1 is a schematic illustration of a thermal barrier coating system deposited on a superalloy.
Figure 2:
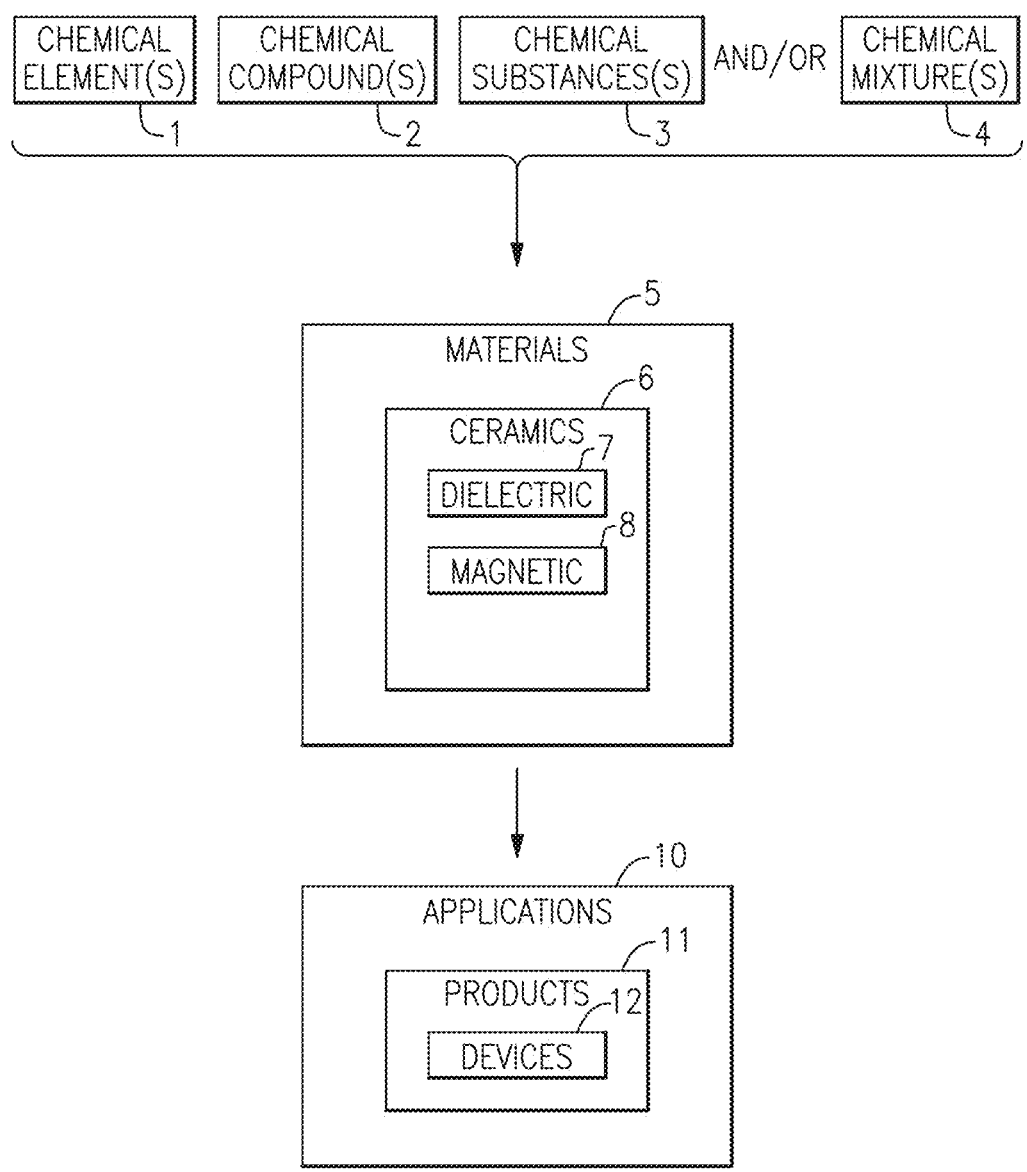
FIG. 2 schematically shows how materials having one or more features described herein can be designed, fabricated, and used.

FIG. 2 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into ceramic materials (block 6) configured to include a desirable dielectric property (block 7), a magnetic property (block 8).

In some embodiments, a material having one or more of the foregoing properties can be implemented in applications (block 10). Such applications can include implementations of one or more features as described herein in devices 12. In some applications, such devices can further be implemented in products 11. Examples of such devices and/or products are described herein.

In the field of thermal management, many second generation, low thermal conductivity ceramic coatings employed as thermal barrier coatings exhibit inferior toughness to the industry standard, yttria-stabilized zirconia (YSZ).

In general, resistance to impact and corrosion resistance in ceramics may be improved by introducing toughening mechanisms which raise the ceramic's resistance to crack propagation (e.g., fracture toughness (K), toughness (G)). Embodiments of the present disclosure can provide a multi-phase ceramic which includes a plurality of toughening mechanisms at use temperatures of interest (e.g., approximately 1100° C. and higher) and exhibits improved toughness, while retaining its thermal insulating properties.

Three-Phase Ceramic Material

Embodiments of the disclosure can be a multi-phased ceramic material which can have advantageous properties as a coating. In some embodiments, the ceramic material can have three different phases as discussed below A first phase of the ceramic, in the as-deposited state, can include a metal oxide which exhibits a stable cubic fluorite phase (c), a stable tetragonal phase (t), or a metastable tetragonal phase (t'). Examples may include, but are not limited to, stabilized zirconium oxide (zirconia, $ZrO_2$) and stabilized hafnium oxide ($HfO_2$). In some embodiments, the fluorite phase may be used as it can have the largest rare earth content, which can be advantageous in creating corrosion resistant phases. In the discussion herein, embodiments of the ceramic composition may be discussed in terms of zirconium oxide. However, it may be understood the disclosed embodiments are not limited only to zirconia but may also include other metal oxides (e.g., hafnia). In some embodiments, ceria (e.g., cerium(IV) oxide) may be the oxide that is used instead of zirconium oxide.

As discussed in greater detail herein, in some embodiments, the first phase of the ceramic may provide transformation toughening. In this process, the phase ahead of a crack under an applied external stress can convert to the higher volume monoclinic phase, arresting crack development. This is particularly applicable for the tetragonal phase. In alternative embodiments, the tetragonal phase ahead of a crack under an applied external stress may be non-transforming and instead rotates to align with the direction of the applied external stress, also arresting crack development. This is commonly referred to as ferroelastic toughening.

A second phase of the ceramic, in the as-deposited state, can include a compound chemically compatible with the stabilized metal oxide first phase. For example, no substantial chemical reaction may take place between the first and second phases. Furthermore, the second phase can possess low symmetry and anisotropic growth habit. In some embodiments, the second phase can include a magnetoplumbite-based phase, such as a magnetoplumbite-based aluminate phase. As discussed herein, this second phase can arrest crack development by the mechanism of crack bridging. In some embodiments, the second phase can include aluminum oxide.

A third phase of the ceramic, in the as-deposited state, can include a compound chemically compatible with both the first and second phases discussed above. For example, no substantial chemical reaction may take place between the first, second, and third phases. Further, it can be advantageous for the phase to have both low symmetry and anisotropic grain growth. In some embodiments, the third phase can be variants of aluminum oxide (also known as alumina with the general composition $Al_2O_3$) or the perovskite $LnAlO_3$ where Ln is an element in the lanthanide series. In some embodiments, the third phase can be $NdAlO_3$. This phase can continue the impact toughness increases gained by the other phases, such as through crack bridging, and can further enhance the resistance of the material to calcium, magnesium, and aluminum silicate (CMAS) corrosion.

While alumina has been incorporated into some ceramic materials in the art, previous disclosures have done so as a co-deposited phase, or essentially layering the alumina for an optically emissive surface. However, embodiments of the disclosure differ as the alumina is not a "layer" but is instead incorporated as a phase with the primary and/or secondary phase.

Further, alumina has been incorporated into the secondary magnetoplumbite phase as a chemical component of that phase, such as in U.S. Pat. Pub. No. 2015/0259251, hereby incorporated by reference in its entirety. However, the alumina is part of the magnetoplumbite chemical composition, and not a separate and distinct phase.

On the other hand, embodiments of the disclosure include alumina as a distinct phase separate from the first and second phases, and thus it can appear as a distinct crystallographic structure. Further, it is not a layer, but is instead a third phase with the first and second phases.

Accordingly, embodiments of the disclosure have two additional phases (a second and tertiary, or third, phase) embedded within a primary phase, forming a three-phase material. This three-phase ceramic composition can improve toughening mechanisms as well as corrosion resistance.

In some embodiments, the first phase can be 40-90 wt. % (or about 40-about 90 wt. %) of the ceramic material. In some embodiments, the second phase can be 10-60 wt. % (or about 10-about 60 wt. %) of the ceramic material. In some embodiments, the third phase can be 10-30 wt. % (or about 10-about 30 wt. %) of the ceramic material.

In some embodiments, the first phase can be 40, 50, 60, 70, 80, 90, or 95 wt. % of the ceramic material. In embodiments, the first phase may be within a range formed by selecting any two numbers (two wt. % values) listed in the immediately previous sentence, e.g., between about 40 and about 95, between about 40 and about 90, or between about 60 and about 80. In some embodiments, the first phase can be greater than 40, 50, 60, 70, 80, 90, or 95 wt. % of the ceramic material. In some embodiments, the first phase can be greater than about 40, about 50, about 60, about 70, about 80, about 90, or about 95 wt. % of the ceramic material. In some embodiments, the first phase can be less than 40, 50, 60, 70, 80, 90, or 95 wt. % of the ceramic material. In some embodiments, the first phase can be less than about 40, about 50, about 60, about 70, about 80, about 90, or about 95 wt. % of the ceramic material.

In some embodiments, the second phase can be 10, 20, 30, 40, 50, or 60 wt. % of the ceramic material. In embodiments, the second phase may be within a range formed by selecting any two numbers (two wt. % values) listed in the immediately previous sentence, e.g., between about 10 and about 60, between about 20 and about 50, or between about 30 and about 40. In some embodiments, the second phase can be greater than 10, 20, 30, 40, 50, or 60 wt. % of the ceramic material. In some embodiments, the second phase can be greater than about 10, about 20, about 30, about 40, about 50, or about 60 wt. % of the ceramic material. In some embodiments, the second phase can be less than 10, 20, 30, 40, 50, 60, or 70 wt. % of the ceramic material. In some embodiments, the second phase can be less than about 10, about 20, about 30, about 40, about 50, about 60, or about 70 wt. % of the ceramic material.

In some embodiments, the third phase can be 5, 10, 15, 20, 25, 30, or 35 wt. % of the ceramic material. In embodiments, the third phase may be within a range formed by selecting any two numbers (two wt. % values) listed in the immediately previous sentence, e.g., between about 5 and about 35, between about 10 and about 30, or between about 5 and about 35. In some embodiments, the third phase can be greater than 5, 10, 15, 20, 25, 30, or 35 wt. % of the ceramic material. In some embodiments, the second phase can be greater than about 5, about 10, about 15, about 20, about 25, about 30, or about 35 wt. % of the ceramic material. In some embodiments, the second phase can be less than 5, 10, 15, 20, 25, 30, or 35 wt. % of the ceramic material. In some embodiments, the second phase can be less than about 5, about 10, about 15, about 20, about 25, about 30, or about 35 wt. % of the ceramic material.

Ceramic Toughening and Corrosion Mechanisms

A brief discussion of transformation toughening, ferroelastic toughening, and crack bridging will now be presented.

Pure $ZrO_2$ can undergo crystallographic phase changes, from the monoclinic phase (m) to the tetragonal phase (t), to the cubic phase (c) with increasing temperature. The volume of zirconia can concurrently decrease when transforming from the m to t to c phase. However, addition of one or more stabilizing agents (e.g., oxides) may stabilize the t-phase in zirconia and inhibit the temperature-dependent phase transformation. In some embodiments, the tetragonal phase may be meta-stable, denoted by t'. However, it may be understood that reference to tetragonal phases herein may include both stable and meta-stable tetragonal phases.

Figures 3A, 3B:
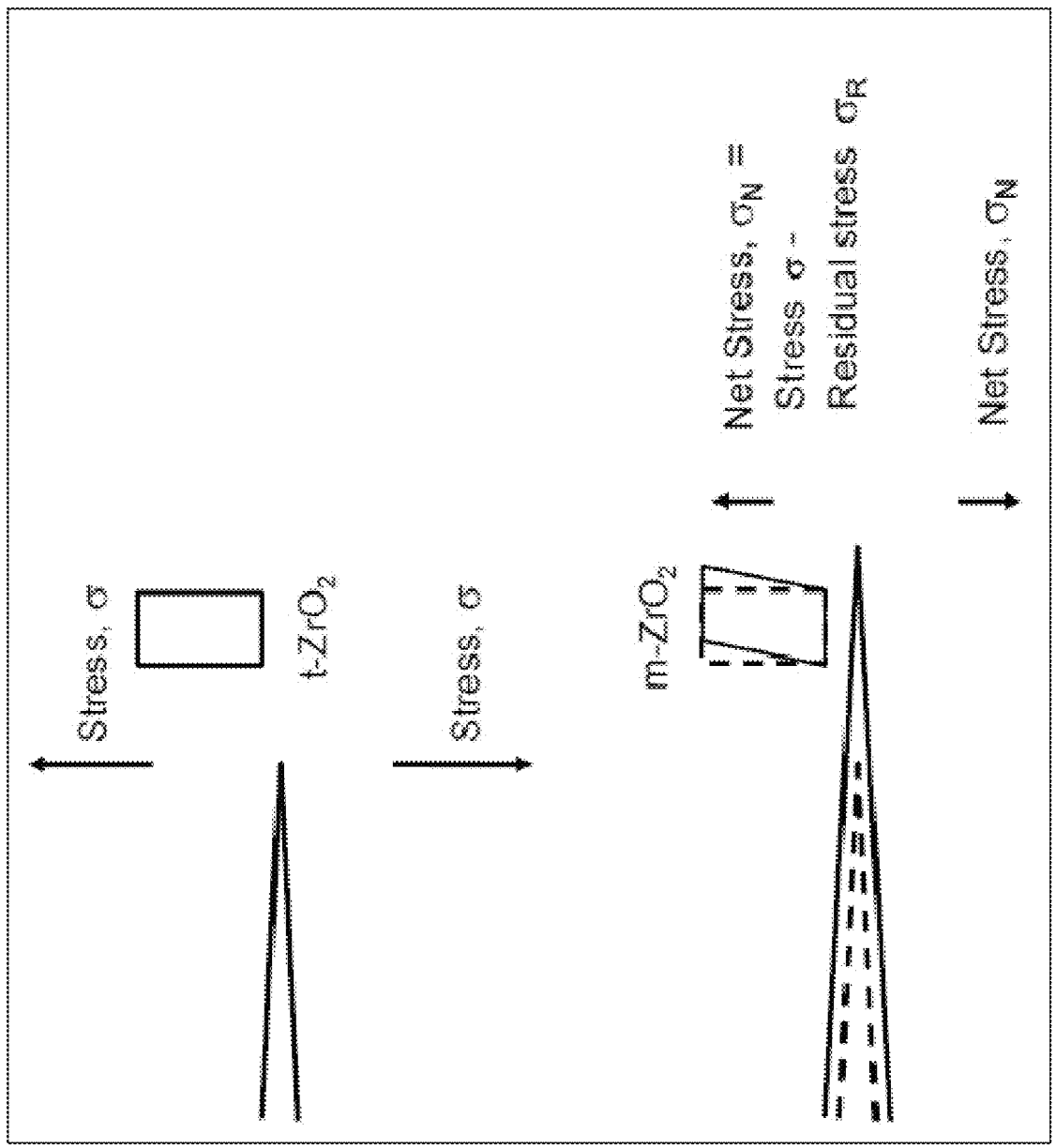
FIGS. 3A-3B are schematic illustrations of a transformation toughening mechanism.

In transformation toughened zirconia, the stabilizing agent can be provided in an amount such that the t-phase is meta-stable with temperature. For example, the $t-ZrO_2$ phase does not exhibit the transformation to another phase with temperature observed in pure zirconia. Instead, when a crack is initiated in the stabilized zirconia, as illustrated in FIG. 3A, some t-phase zirconia in the region of elevated stress ahead of the crack tip may be transformed to the m-phase. The volume expansion accompanying the $t-ZrO_2$ to $m-ZrO_2$ phase transformation can result in development of residual compressive stresses in the zirconia about the $m-ZrO_2$ which can reduce the net effect of the remote stress, as illustrated in FIG. 3B. Thus, absent an increase in the remotely applied stress, crack propagation can be arrested due to the phase transformation of $t-ZrO_2$ to $m-ZrO_2$, toughening the ceramic.

In ferroelastic toughening, a ceramic capable of forming a metastable tetragonal phase (e.g., zirconia, hafnia) can be employed. One or more stabilizing agents can be provided in respective amounts such that the t-phase does not transform to the m-phase on cooling. However, this t-phase can be distinguished from that observed in transformation toughening, as it does not transform to the m-phase when exposed to elevated stress either. With reference to FIGS. 4A and 4B, a crack is illustrated in a stabilized zirconia, where a region of the t-phase is present ahead of the crack tip. When the crack propagates under the influence of a remotely applied stress, some of the t-phase zirconia in the region of elevated stress ahead of the crack tip can rotate to become aligned in the direction of the remotely applied stress. In some situations, such an alignment can include an axis of the t-phase zirconia having a direction component common with a direction component of the remotely applied stress. This switching can cause residual stresses to develop in the zirconia about the switched t-$ZrO_2$ which reduces the net effect of the remote stress, as illustrated in FIG. 4B. As a result, further crack growth can be inhibited. In some situations, such a stoppage of crack growth can be realized is there is no significant increase in the remotely applied stress.

With reference to FIGS. 5A and 5B, in crack bridging, a second and/or third phase material can be dispersed within a first phase material. In some embodiments, the third phase would be a dispersed equiaxed material phase. When the crack propagates under the influence of a remotely applied stress, it can impinge upon the second or third phase. Assuming that the second and third phase does not fracture, further growth of the crack can be achieved by deflection of the crack around the periphery of the second or third phase. Thus, the second and third phase can toughen the ceramic in two ways. First, in order for the crack to deflect about the second and third phase, debonding can occur between the second phase, the third phase, and/or the first phase. Accordingly, debonding typically requires that the applied stress be increased, which elevates the toughness of the multi-phase ceramic. As the crack further propagates and opens, frictional sliding can take place between the surface of the second and third phase and the adjacent edges of the crack. The applied stress can also be increased to overcome the frictional sliding resistance between the crack and the second and third phase, further elevating the toughness of the multi-phase ceramic.

The third phase may also inhibit crack growth by dispersion toughening. For example, the third phase can create a compressive stress field around a particular dispersed phase or crack, thereby blunting the propagation of the crack.

Crack bridging has not previously been employed as a toughening mechanism in thermal barrier coatings. A technical barrier which has hindered implementation of crack bridging in TBCs has been the ability to identify second and third phases that are chemically compatible with the stabilized metal oxide. For example, to form the second and third phases requires at least a ternary (three-component) system of the metal oxide, an oxide stabilizing the t-phase of the metal oxide, and an oxide of the magnetoplumbite former. As discussed in greater detail herein, more complex magnetoplumbites may also be formed from higher order systems (e.g., quaternary, or four components, five components, six components, seven components, etc.). However, the phase diagrams (e.g., equilibrium/meta-stable phases as a function of composition) of many ternary and higher component oxide systems, including those examples discussed herein, have not previously been measured. Accordingly, embodiments of the compatible second phases and third phases for stabilized metal oxides discussed herein have not previously been known.

Further, embodiments of the disclosure can advantageously have increased CMAS resistance. This can occur because the alumina tertiary phase can react with outside particles, such as sand, to form anorthite. The anorthite could be formed on the surface, such as a layer on the surface. This is particularly advantageous in sandy environments such as, for example, in the Middle East. Sand can enter engines running at high temperature where the coating is used and melt to form the CMAS particles, which can provide deleterious effects to the coating and the device that is covered by the coating. $NdAlO_3$ may also form the anorthite.

$NdAlO_3$ may also react with CMAS to form desirable aluminate based phases such as apatites. Similar to anorthite, apatite based phases can serve as effective barriers for CMAS penetration into thermal barrier coatings. The apatite can form on the surface, such as on a layer on the surface. Alumina may also form this apatite.

Ceramic Composition

In an embodiment, the first phase of the ceramic may include a metal oxide which exhibits a cubic, tetragonal, or a meta-stable tetragonal phase after deposition on a substrate. For example, the metal oxide may be a stabilized metal oxide, in which one or more stabilizing elements are substituted for the zirconium atoms in $ZrO_2$. The stabilization may occur since the larger ions than Zr prefer 8 co-ordination more so than zirconia which ideally prefers a coordination number lower than 8. The cubic fluorite phase prefers 8 co-ordination. Examples of single stabilizing elements may be selected from, but are not limited to, Mg, Ca, Sc, Y, In, Ga, and lanthanides (e.g., La, Ce, Pr, Nd, Sm, Eu, Gd, Tb, Dy, Ho, Er, Tm, and Yb). In alternative embodiments, the zirconia may be co-stabilized with two elements, a first element selected from one of Mg, Ca, Sc, Y, In, Ga, and lanthanides (e.g., La, Ce, Pr, Nd, Sm, Eu, Gd, Tb, Dy, Ho, Er, Lu, Tm, and Yb) and a second element selected from Nb and Ta. The second phase may include aluminates with the magnetoplumbite structure. The third phase may further include alumina or a perovskite aluminate or a similar material.

Ternary Thermal Barrier Coating Compositions

In some embodiments, the ceramic composition may be formed from a ternary (three-component) system given by $Ln_2O_3$—$(Zr,Hf)_2$—$Al_2O_3$. For clarity in the discussion herein, reference will be made to zirconia. However, it may be understood that embodiments of the disclosure may alternatively employ hafnia or another metal oxide capable of forming a stabilized tetragonal phase.

The addition of $Ln_2O_3$ and $Al_2O_3$ to the ceramic can promote formation of a second phase magnetoplumbite-based aluminate formed from $Ln_2O_3$—$Al_2O_3$ that is chemically compatible with a first tetragonal zirconia stabilized by Ln. In some embodiments, the magnetoplumbite-based aluminate can have the form $LnAl_{11}O_{18}$. Ln may be selected from lanthanides, including, but not limited to, La, Pr, Nd, and Sm. Notably, in embodiments of the ternary system, the same lanthanide, Ln, can be used to stabilize the zirconia and form a second phase magnetoplumbite-based aluminate compatible with the stabilized zirconia of that particular lanthanide.

Further, the composition can be determined to drive formation of the alumina third phase as discussed above.

Figure 6:
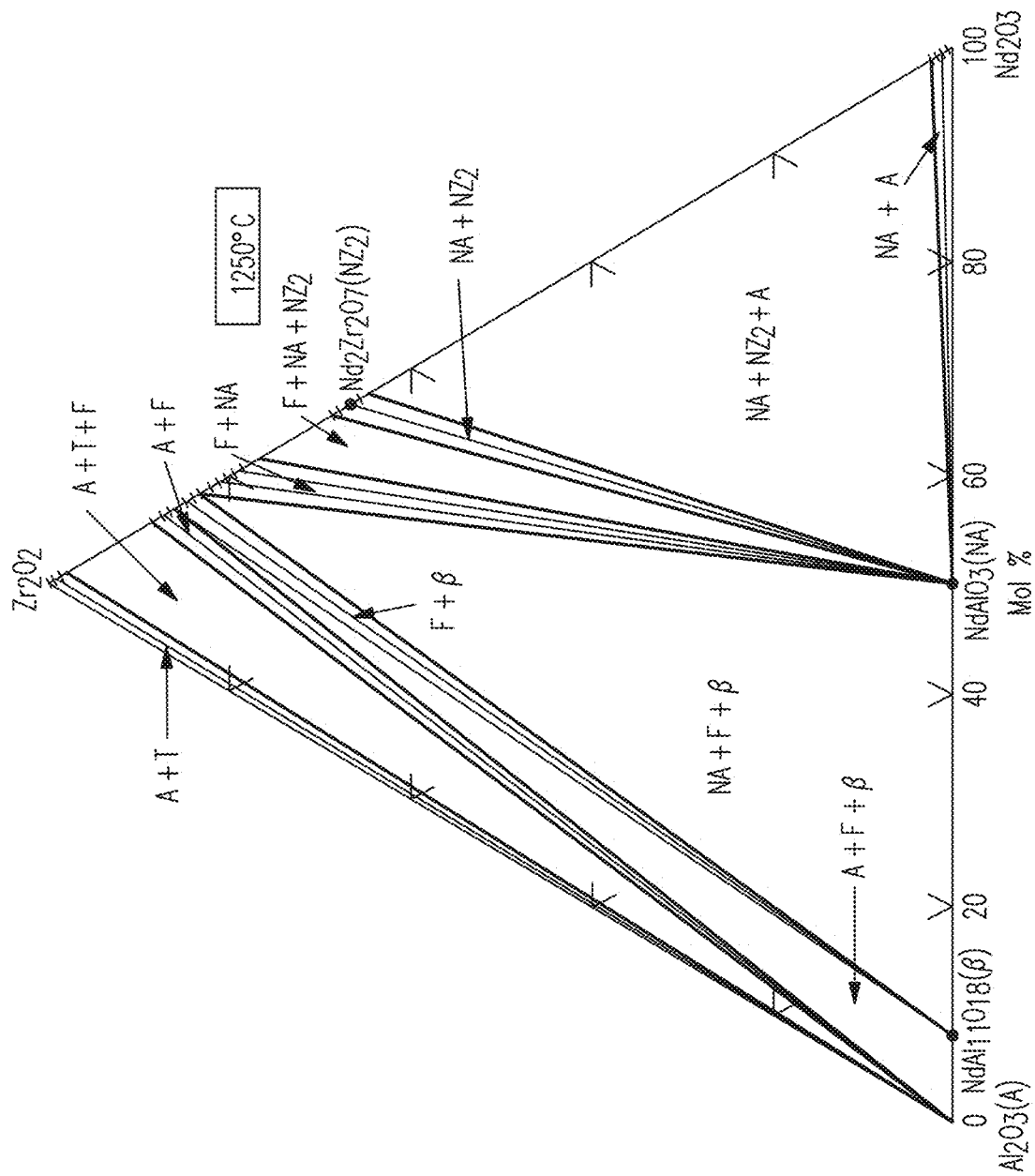
FIG. 6 is a phase diagram for the ternary $ZrO_2$—$Nd_2O_3$—$Al_2O_3$ system at about 1250° C. which can include the three-phase composition.

For example, assume that Ln is Nd. The ternary phase diagram for $Nd_2O_3$—$ZrO_2$—$Al_2O_3$ at 1250° C. is illustrated in FIG. 6. In the phase diagram, A denotes the corundum phase of alumina, T denotes tetragonal $ZrO_2$, F denotes fluorite (cubic zirconia), $NZ_2$ denotes a pyrochlore-type phase, NA denotes a perovskite-type phase, and β denotes the magnetoplumbite-based aluminate, $NdAl_{11}O_{18}$. Alumina and/or the perovskite would look more like the zirconia phase in terms of grain shape. Unlike some prior art discussions, it can now be advantageous to include the A phase (e.g., the corundum phase) as discussed above to allow us to achieve the three-phase ceramic composition.

The compositions for generating a two-phase field labeled F+β. This phase field extends between the vertices given by:
about 10 mol. % $Nd_2O_3$-about 90 mol. % $Al_2O_3$-about 0 mol. % $ZrO_2$ ($NdAl_{11}O_{18}$) on the $Al_2O_3$—$Nd_2O_3$ axis (bottom of FIG. 6) to about 14 mol. % $Nd_2O_3$-about 0 mol. % $Al_2O_3$-about 86 mol. % $ZrO_2$ on the $ZrO_2$—$Nd_2O_3$ axis (right side of FIG. 6) to about 17 mol. % $Nd_2O_3$-about 0 mol. % $Al_2O_3$-about 83 mol. % $ZrO_2$ on the $ZrO_2$—$Nd_2O_3$ axis (right side of FIG. 6).

However, the three-phase field would differ in order to include alumina (e.g., corundum) A, and would be in the three-phase field labeled A+F+β. For example, this phase field can extend between the vertices given by:

about 0 mol. % $Nd_2O_3$-about 100 mol. % $Al_2O_3$-about 0 mol. % $ZrO_2$ ($NdAl_{11}O_{18}$) on the $Al_2O_3$—$Nd_2O_3$ axis (bottom of FIG. 6) to about 10 mol. % $Nd_2O_3$-about 90 mol. % $Al_2O_3$-about 0 mol. % $ZrO_2$ ($NdAl_{11}O_{18}$) on the $Al_2O_3$—$Nd_2O_3$ axis (bottom of FIG. 6) to about 17 mol. % $Nd_2O_3$-about 0 mol. % $Al_2O_3$-about 83 mol. % $ZrO_2$ on the $ZrO_2$—$Nd_2O_3$ axis (right side of FIG. 6).

For the bottom axis of $Al_2O_3$—$Nd_2O_3$, the following mol. % can be used for the vertices. $Nd_2O_3$ can be between 0 and 10 mol. % (or between about 0 and about 10 mol. %). In some embodiments, Nd2O3 can be 0, 1, 2, 3, 4, 5, 6, 7, 8, 9, or 10 mol. % (or about 0, about 1, about 2, about 3, about 4, about 5, about 6, about 7, about 8, about 9, or about 10 mol. %). In some embodiments, $Nd_2O_3$ can be greater than 0, 1, 2, 3, 4, 5, 6, 7, 8, 9, or 10 mol. % (or greater than about 0, about 1, about 2, about 3, about 4, about 5, about 6, about 7, about 8, about 9, or about 10 mol. %). In some embodiments, $Nd_2O_3$ can be less than 1, 2, 3, 4, 5, 6, 7, 8, 9, or 10 mol. % (or less than about 0, about 1, about 2, about 3, about 4, about 5, about 6, about 7, about 8, about 9, or about 10 mol. %). In some embodiments, $Al_2O_3$ can be between 90 and 100 mol. % (or between about 90 and about 100 mol. %). In some embodiments, $Al_2O_3$ can be 90, 91, 92, 93, 94, 95, 96, 97, 98, 99, or 100 mol. % (or about 90, about 91, about 92, about 93, about 94, about 95, about 96, about 97, about 98, about 99, or about 100 mol. %). In some embodiments, $Al_2O_3$ can be greater than 90, 91, 92, 93, 94, 95, 96, 97, 98, or 99 mol. % (or greater than about 90, about 91, about 92, about 93, about 94, about 95, about 96, about 97, about 98, about 99, or about 100 mol. %). In some embodiments, $Al_2O_3$ can be less than 90, 91, 92, 93, 94, 95, 96, 97, 98, 99, or 100 mol. % (or less than about 90, about 91, about 92, about 93, about 94, about 95, about 96, about 97, about 98, about 99, or about 100 mol. %). In some embodiments, $ZrO_2$ can be 0 (or about 0) mol. %.

For the right side axis of the $ZrO_2$—$Nd_2O_3$, the following mol. % can be used for the vertices. In some embodiments, $Nd_2O_3$ can be 10, 11, 12, 13, 14, 15, 16, 17, 18, 19, or 20 mol. % (or about 10, about 11, about 12, about 13, about 14, about 15, about 16, about 17, about 18, about 19, or about 20 mol. %). In some embodiments, $Nd_2O_3$ can be greater than 10, 11, 12, 13, 14, 15, 16, 17, 18, 19, or 20 mol. % (or greater than about 10, about 11, about 12, about 13, about 14, about 15, about 16, about 17, about 18, about 19, or about 20 mol. %). In some embodiments, $Nd_2O_3$ can be less than 10, 11, 12, 13, 14, 15, 16, 17, 18, 19, or 20 mol. % (or less than about 10, about 11, about 12, about 13, about 14, about 15, about 16, about 17, about 18, about 19, or about 20 mol. %). In some embodiments, $ZrO_2$ can be 90, 89, 88, 87, 86, 85, 84, 83, 82, 81, or 80 mol. % (or about 90, about 89, about 88, about 87, about 86, about 85, about 84, about 83, about 82, about 81, or about 80 mol. %). In some embodiments, $ZrO_2$ can be greater than 90, 89, 88, 87, 86, 85, 84, 83, 82, 81, or 80 mol. % (or greater than about 90, about 89, about 88, about 87, about 86, about 85, about 84, about 83, about 82, about 81, or about 80 mol. %). In some embodiments, $ZrO_2$ can be less than 90, 89, 88, 87, 86, 85, 84, 83, 82, 81, or 80 mol. % (or less than about 90, about 89, about 88, about 87, about 86, about 85, about 84, about 83, about 82, about 81, or about 80 mol. %). In some embodiments, $Al_2O_3$ can be 0 (or about 0) mol. %.

In this phase field, the second phase magnetoplumbite-based aluminate, $NdAl_{11}O_{18}$, can be present as well as the third phase alumina. Thus, it is expected that toughening due to crack bridging will take place in the ceramic. Stabilized $ZrO_2$ ($ZrO_2$—$Nd_2O_3$) may form the tetragonal or cubic phase zirconia on deposition of the composition and cooling. Accordingly, it is also expected that toughening due to at least one of transformation toughening and ferroelastic toughening will take place, depending on whether the tetragonal zirconia undergoes phase transformation under stress or is non-transforming and aligns with the external field under stress.

Although the phase diagram for FIG. 6 is isothermal, representing the phase states of the ternary $Nd_2O_3$—$ZrO_2$—$Al_2O_3$ system at 1250° C., it is expected that the A+F+β phase field will also persist at temperatures higher and lower than 1250° C. Notably, however, the shape of the A+F+β phase field may change with temperature. For example, it is expected that, as the temperature increases, the upper limit of $ZrO_2$ in the F phase (e.g., the intersection of the top leg of the phase field with the $ZrO_2$—$Nd_2O_3$ axis) will move towards greater $ZrO_2$ (upwards). Furthermore, it is expected that, as the temperature decreases, the lower limit of the $ZrO_2$ in the F phase (e.g., the intersection of the bottom leg of the phase field with the $ZrO_2$—$Nd_2O_3$ axis) will move towards greater $Nd_2O_3$ (downwards).

Quaternary Ceramic Compositions

In alternative embodiments, the three-phase ceramic composition may be formed from a quaternary (four component) system given by, for example, $Ln_2O_3$-$Ln'_2O_3$—$ZrO_2$—$Al_2O_3$. The three-phase ceramic formed from this system may include a second phase magnetoplumbite-based aluminate formed from $Ln_2O_3$ and $Al_2O_3$ that is chemically compatible with a first, tetragonal zirconia phase stabilized by Ln' and a third phase discussed above. This quaternary system can be in contrast to the ternary system discussed herein, where Ln is employed both for forming the magnetoplumbite, as well as stabilizing the zirconia. In some embodiments, Ln can be a magnetoplumbite former with aluminum oxide and may be selected from lanthanides including, but not limited to, La, Pr, Nd, and Sm. In further embodiments, Ln' can be a trivalent stabilizer of zirconia different than Ln and may be selected from lanthanides (e.g., La, Ce, Pr, Nd, Sm, Eu, Gd, Tb, Dy, Ho, Er, Tm, and Yb) as well as Sc, Y, Lu, Ga, Fe, Mn, Cr, In, and Bi. The amount of the magnetoplumbite formed, in certain embodiments, may be between about 10 mol. % and less than about 50 mol. %.

Five Component Ceramic Compositions

In an embodiment, the three-phase ceramic composition may be formed from a five component system given by, for example, $MO_x$-$Ln_2O_3$-$Ln'_2O_3$—$ZrO_2$—$Al_2O_3$, where $MO_x$ can be a metal magnetoplumbite former with aluminum oxide and Ln and Ln' can be as described herein. The addition of the $MO_x$ metal oxide to the ceramic can promote formation of a three-phase ceramic including a more complex magnetoplumbite-based aluminate second phase formed from $MO_x$, $Ln_2O_3$, and $Al_2O_3$ that is chemically compatible with a first, tetragonal zirconia phase stabilized by Ln' as well as the chemically compatible third phase. In some embodiments, M can be selected from Na, K, Mg, Li, Ca, Sr, and Ba. Ln can be a magnetoplumbite former with aluminum oxide and may be selected from lanthanides including, but not limited to, La, Pr, Nd, and Sm. In further embodiments, Ln' can be different from Ln and may be selected from lanthanides (e.g., La, Ce, Pr, Nd, Sm, Eu, Gd, Tb, Dy, Ho, Er, Tm, and Yb), as well as Sc, Y, Lu, In, Ga, Fe, Mn, Cr, and Bi. The amount of the magnetoplumbite formed, in some embodiments, may be between about 10 mol. % and less than about 50 mol. %.

In other embodiments, the three-phase ceramic composition may be formed from five component system given by, for example, $Ln_2O_3$-$Ln'_2O_3$-M'O—$ZrO_2$—$Al_2O_3$ or $Ln_2O_3$-$Ln'_2O_3$-M"O—$ZrO_2$—$Al_2O_3$. In these embodiments, the M'O or M"O can be employed in conjunction with Ln' as a co-stabilizer for $ZrO_2$. The three-phase ceramic formed from this system can include a magnetoplumbite-based aluminate second phase formed from $Ln_2O_3$ and $Al_2O_3$ that is chemically compatible with a first, tetragonal zirconia phase co-stabilized by both M' and Ln' or M" and Ln'. In some embodiments, M'O can be a divalent co-stabilizer of zirconia. For example, M' may be selected from Mg and Ca. In other embodiments, M"0 can be a pentavalent co-stabilizer of zirconia. For example, M" may be selected from Nb, Ta, and Sb. Ln can be a magnetoplumbite former with aluminum oxide and may be selected from lanthanides including, but not limited to, La, Pr, Nd, and Sm. In further embodiments, Ln' can be a trivalent stabilizer of zirconia different than Ln and may be selected from lanthanides (e.g., La, Ce, Pr, Nd, Sm, Eu, Gd, Tb, Dy, Ho, Er, Tm, and Yb), as well as Sc, Y, Lu, In, Ga, Fe, Mn, Cr, and Bi). The amount of the magnetoplumbite formed, in some embodiments, may be between about 10 mol. % and less than about 50 mol. %.

Six Component Ceramic Compositions

In an embodiment, the three-phase ceramic composition may be formed from a six component system given by, for example, $MO_x$-$Ln_2O_3$-$Ln'_2O_3$-M'O—$ZrO_2$—$Al_2O_3$ or $MO_x$-$Ln_2O_3$-$Ln'_2O_3$-M"O—$ZrO_2$—$Al_2O_3$, where both $MO_x$ and M'O or $MO_x$ and M"O can be included in the composition, as discussed herein. The addition of the $MO_x$ metal oxide to the ceramic can promote formation a three-phase ceramic including a complex magnetoplumbite second phase formed from $MO_x$, $Ln_2O_3$, and $Al_2O_3$ that is chemically compatible with a first, tetragonal zirconia phase co-stabilized by Ln' and either M'O or M"O. M, M', M", Ln, and Ln' can be as described herein in the discussion of five component TBC systems. The amount of the magnetoplumbite formed, in some embodiments, may be between about 10 mol. % and less than about 50 mol. %.

Seven Component Ceramic Compositions

In an embodiment, the three-phase ceramic composition may be formed from a seven component system given by, for example, $MO_x$-$Ln_2O_3$-$Ln'_2O_3$-M"O-AO—$ZrO_2$—$Al_2O_3$, where AO, a divalent stabilizer of zirconia, can be added to a six component TBC composition as described herein. The three-phase ceramic formed from this system can include a complex magnetoplumbite-based aluminate formed from $MO_x$-$Ln_2O_3$—$Al_2O_3$ that is chemically compatible with a first, tetragonal zirconia phase stabilized by Ln' (trivalent zirconia stabilizer), M"O (pentavalent zirconia stabilizer), and AO (divalent zirconia stabilizer). M, M', M", Ln, Ln' can be as described herein and AO can be selected from divalent stabilizers of aluminum. A may be selected from Mg and Ca. The amount of the magnetoplumbite formed, in some embodiments, may be between about 10 mol. % and less than about 50 mol. %.

Microstructure

The example ceramic compositions described herein may be prepared for deposition on a substrate. For example, in one embodiment, a composition having one or more features as described herein may be prepared as a powder, suitable for spray deposition (e.g., plasma spray, high velocity oxygen fuel). In alternative embodiments, the composition may be prepared as an ingot suitable for vapor deposition (e.g., electron-beam physical vapor deposition (EB-PVD), electrostatic spray assisted vapor deposition (ESAVD), direct vapor deposition, etc.). The manner of preparing and depositing thermal barrier coating compositions are generally understood in the art and not discussed in detail herein.

Figure 7:
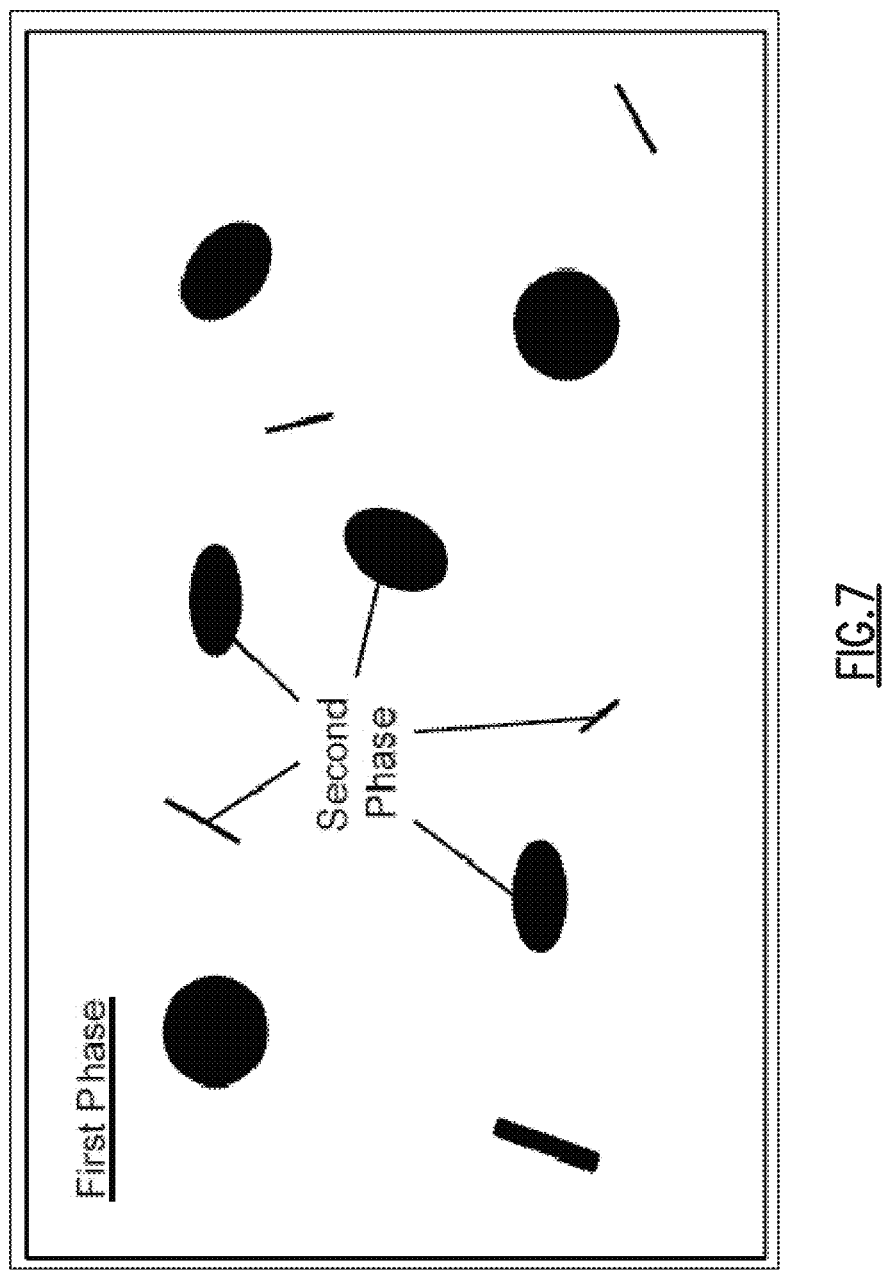
FIG. 7 is a schematic illustration of the microstructure of a ceramic of an embodiment of the present disclosure illustrating the stabilized metal oxide matrix and magnetoplumbite second phase.

FIG. 7 illustrates a schematic example of an anticipated microstructure of a two-phase ceramic composition as discussed herein, after deposition and cooling. Additional third phases of alumina can be added in as well. For example, first phase of zirconia, at least a portion of which includes tetragonally stabilized zirconia, can surround a plurality of magnetoplumbite-based aluminate second phase particles. The second phase may be distributed throughout the first phase and may be oriented at a plurality of angles. The third phase, not shown in the figure, would form more non-needle shaped grains, and be a dispersed equiaxed phase.

Testing Results

FIGS. 8A-13B illustrate x-ray diffraction testing results for embodiments of the disclosure which can show the different phases found in the ceramic material.

Figure 8A:
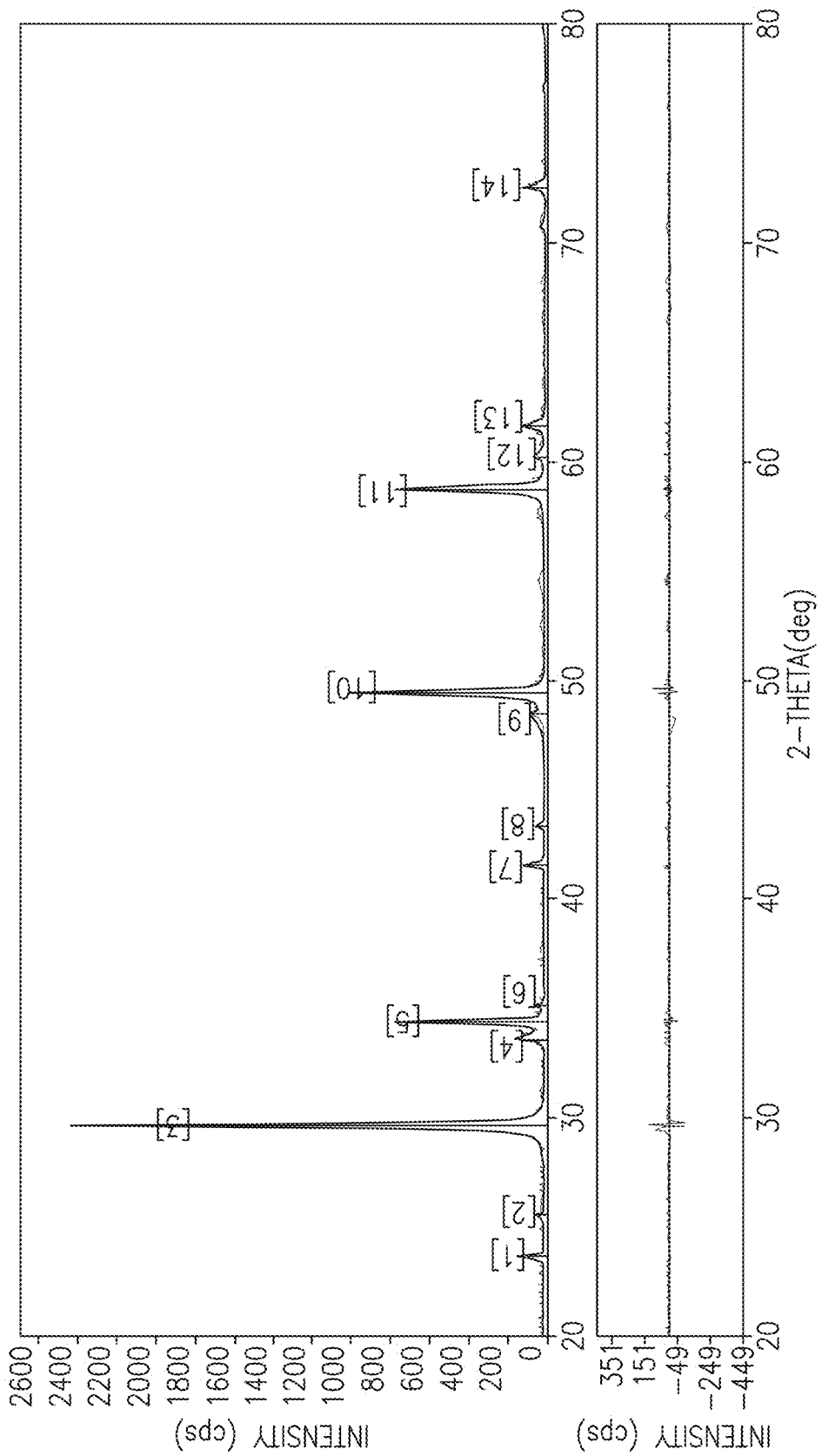
Figure 8B:
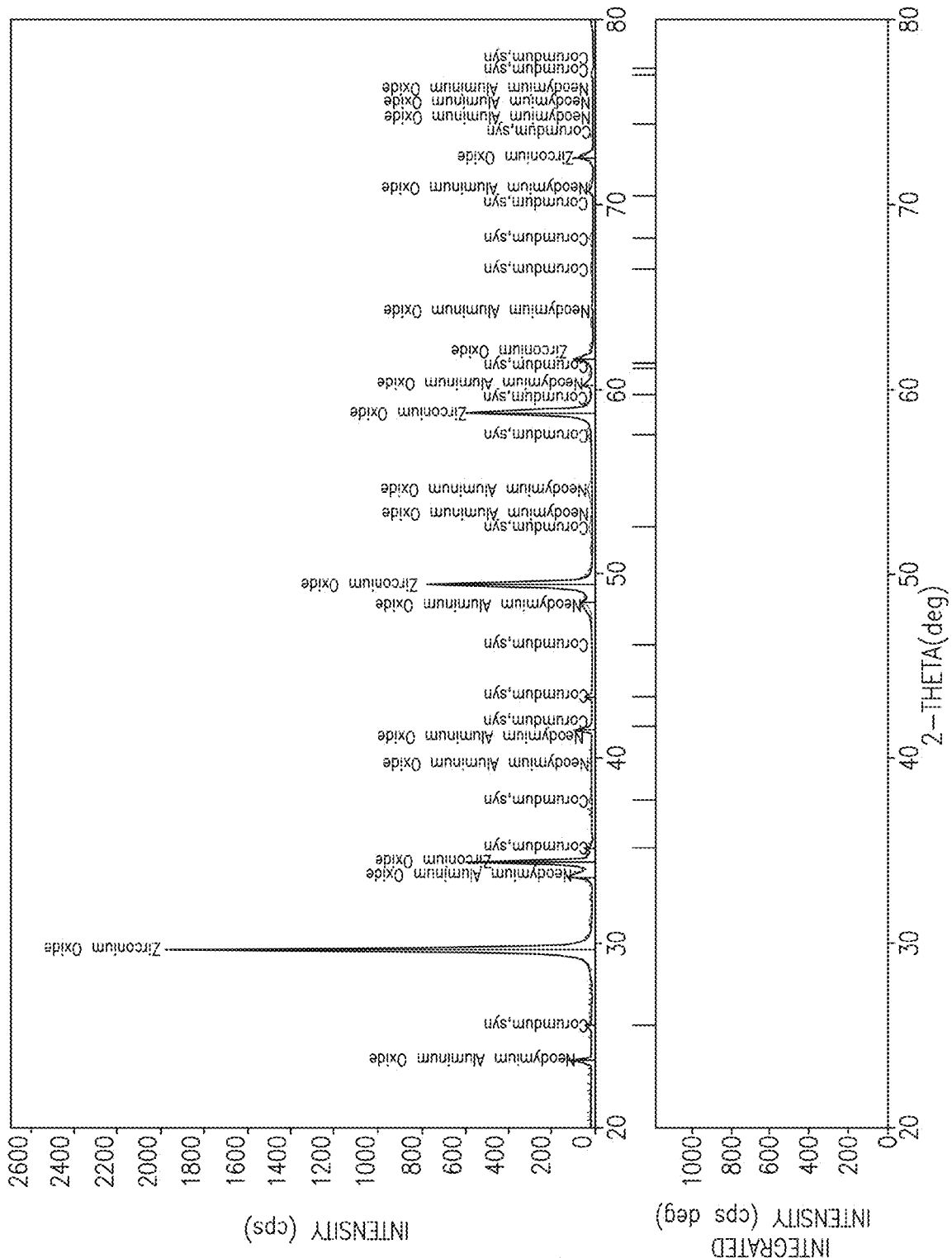

FIGS. 8A-B illustrate the x-ray diffraction results of an embodiment of a ceramic material with Table I below showing the resulting data.

TABLE I

Experimental data for Example 1

| No. | 2-theta (deg) | d (ang.) | FWHM (deg) | Int. I (cps deg) | Int. W (deg) | Phase data name |
|---|---|---|---|---|---|---|
| ☐1 | 23.703(12) | 3.7506(19) | 0.175(14) | 19.1(11) | 0.21(7) | Neodymium Aluminum Oxide(0, 1, 2) |
| ☐2 | 25.5778 | 3.47977 | 0.17523 | 4.89513 | 0.150648 | Corundum, syn(0, 1, 2) |
| ☐3 | 29.664(7) | 3.0091(7) | 0.162(7) | 457(5) | 0.247(16) | Zirconium Oxide(1, 1, 1) |
| ☐4 | 33.604(13) | 2.6647(10) | 0.26(2) | 41(2) | 0.38(11) | Neodymium Aluminum Oxide(1, 0, 4) |
| ☐5 | 34.413(4) | 2.6039(3) | 0.116(7) | 113(2) | 0.18(2) | Zirconium Oxide(2, 0, 0) |
| ☐6 | 35.18(2) | 2.5485(17) | 0.13(3) | 5.0(10) | 0.15(10) | Corundum, syn(1, 0, 4) |
| ☐7 | 41.578(13) | 2.1703(7) | 0.118(16) | 14.1(11) | 0.16(6) | Neodymium Aluminum Oxide(2, 0, 2) |
| ☐8 | 43.3595 | 2.08512 | 0.117665 | 4.97092 | 0.148698 | Corundum, syn(1, 1, 3) |
| ☐9 | 48.5106 | 1.87506 | 0.555672 | 34.4459 | 0.579624 | Neodymium Aluminum Oxide(0, 2, 4) |
| ☐10 | 49.463(7) | 1.8411(2) | 0.168(9) | 219(4) | 0.26(3) | Zirconium Oxide(2, 2, 0) |
| ☐11 | 58.752(5) | 1.57027(11) | 0.157(8) | 165(3) | 0.24(3) | Zirconium Oxide(3, 1, 1) |
| ☐12 | 60.24(6) | 1.5350(14) | 0.28(8) | 12.7(15) | 0.4(2) | Neodymium Aluminum Oxide(0, 1, 8) |
| ☐13 | 61.66(2) | 1.5029(4) | 0.18(2) | 29.4(14) | 0.28(8) | Zirconium Oxide(2, 2, 2) |
| ☐14 | 72.542(16) | 1.3020(3) | 0.154(16) | 23.9(14) | 0.20(6) | Zirconium Oxide(4, 0, 0) |

As shown, zirconium oxide is the predominate primary phase formed for this material. Following, a magnetoplumbite structure of neodymium aluminum oxide is formed, which would be the second phase discussed above. Additional, a third phase is formed, which is corundum. This corundum is also known as aluminum oxide/alumina ($Al_2O_3$) and is the third phase discussed above.

Figure 9A:
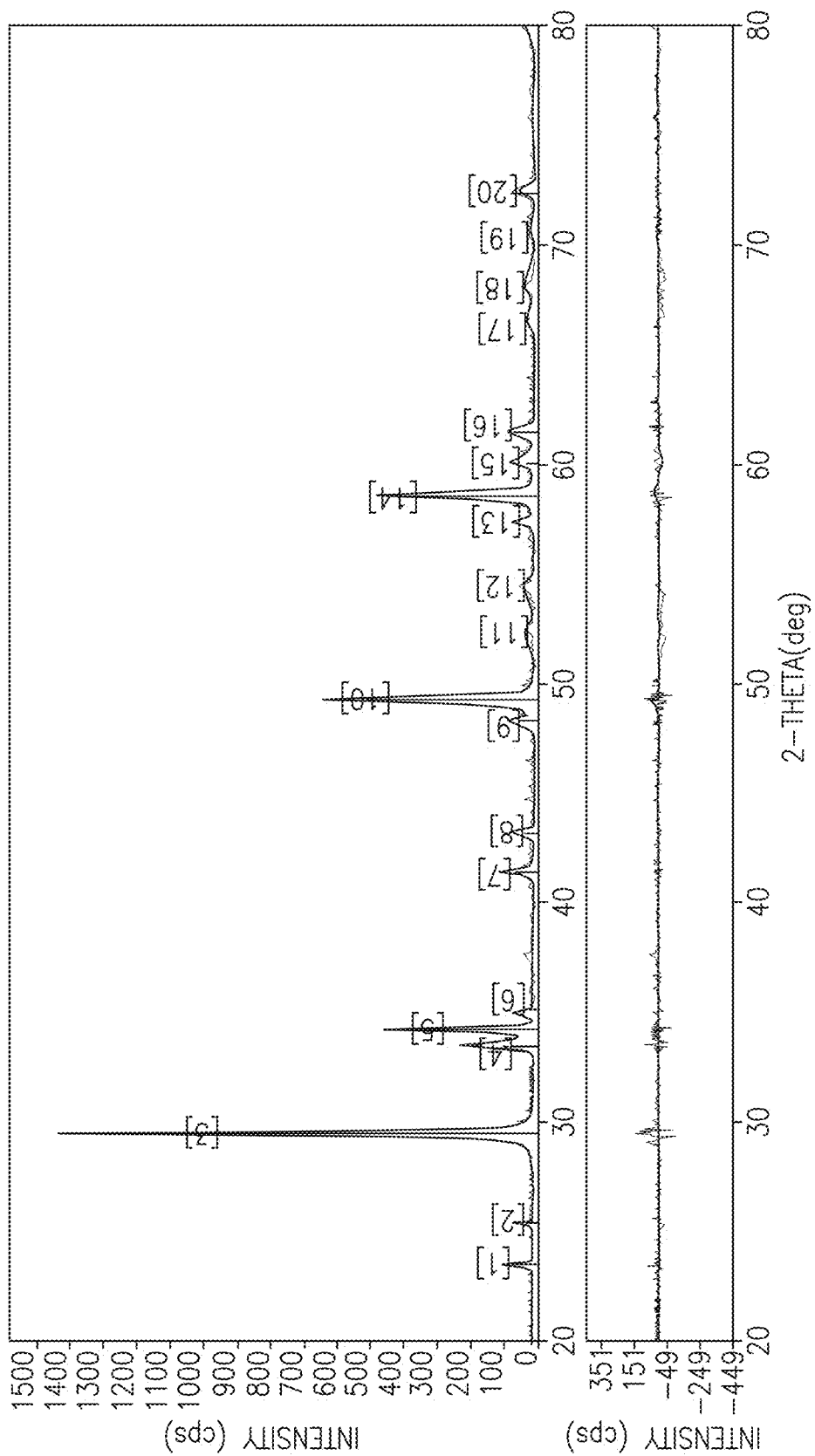
Figure 9B:
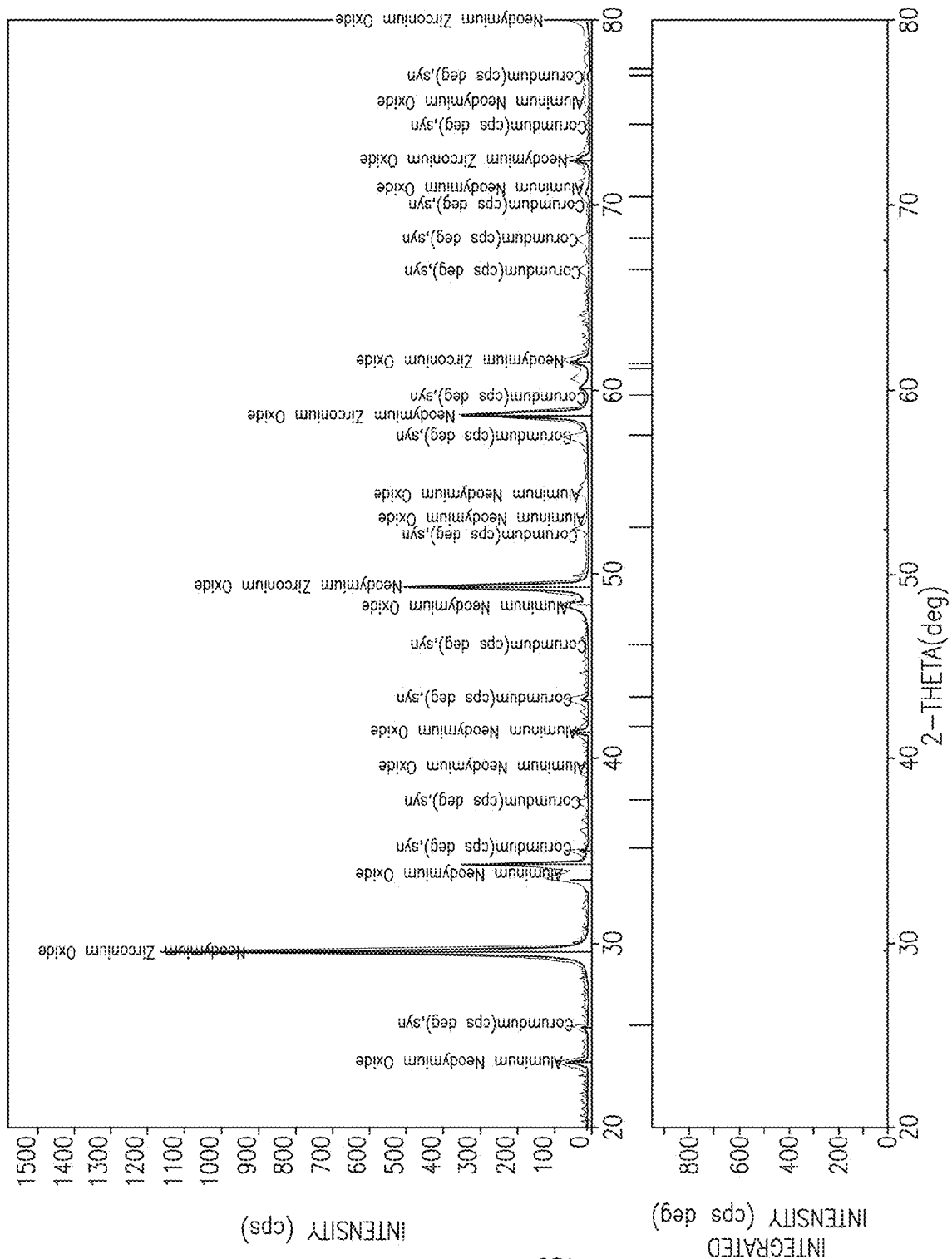

FIGS. 9A-B illustrate the x-ray diffraction results of an embodiment of a ceramic material with Table II below illustrating the resulting data.

TABLE II

Experimental data for Example 2

| No. | 2-theta (deg) | d (ang.) | FWHM (deg) | Int. I (cps deg) | Int. W (deg) | Phase data name |
|---|---|---|---|---|---|---|
| 1 | 23.56(3) | 3.773(5) | 0.27(3) | 24.0(16) | 0.31(11) | Aluninum Neodymium Oxide(0, 1, 2) |
| 2 | 25.4343 | 3.49907 | 0.265833 | 10.5645 | 0.212974 | Corundum (Cr-doped), syn(0, 1, 2) |
| 3 | 29.555(8) | 3.0199(8) | 0.259(8) | 315(4) | 0.33(3) | Neodymium Zirconium Oxide(1, 1, 1) |
| 4 | 33.47(2) | 2.6753(15) | 0.38(2) | 50(2) | 0.43(11) | Aluminum Neodymium Oxide(1, 1, 0) |
| 5 | 34.258(12) | 2.8153(9) | 0.234(9) | 76(2) | 0.27(5) | Neodymium Zirconium Oxide(2, 0, 0) |
| 6 | 34.9973 | 2.56177 | 0.233715 | 10.9557 | 0.199416 | Corundum (Cr-doped), syn(1, 0, 4) |
| 7 | 41.41(3) | 2.1786(18) | 0.18(5) | 22.4(13) | 0.28(9) | Aluminum Neodymium Oxide(2, 0, 2) |
| 8 | 43.26(4) | 2.0895(18) | 0.24(3) | 13.7(13) | 0.28(12) | Corundum (Cr-doped), syn(1, 1, 3) |
| 9 | 48.37(4) | 1.8803(13) | 0.34(4) | 17.4(13) | 0.40(17) | Aluminum Neodymium Oxide(0, 2, 4) |
| 10 | 49.330(9) | 1.8458(3) | 0.243(10) | 163(2) | 0.34(4) | Neodymium Zirconium Oxide(2, 2, 0) |
| 11 | 52.419 | 1.74408 | 1.15386 | 21.0444 | 0.867010 | Aluminum Neodymium Oxide(1, 0, 7), Corundum (Cr-doped), syn |
| 12 | 54.4677 | 1.68322 | 1.15388 | 23.8826 | 0.887508 | Aliminum Neodymium Oxide(1, 2, 2) |
| 13 | 57.41(3) | 1.6038(7) | 0.24(3) | 11.9(12) | 0.26(12) | Corundum (Cr-doped), syn(1, 1, 6) |
| 14 | 58.620(13) | 1.5735(3) | 0.268(12) | 123(2) | 0.35(6) | Neodymium Zirconium Oxide(3, 1, 1) |
| 15 | 60.01(4) | 1.5403(9) | 0.46(4) | 22.0(16) | 0.5(2) | Aluminum Neodymium Oxide(3, 0, 0) |
| 16 | 61.49(5) | 1.5068(10) | 0.35(4) | 27.0(15) | 0.45(16) | Neodymium Zirconium Oxide(2, 2, 2), Corundum (Cr-doped), syn |
| 17 | 66.4171 | 1.40642 | 1.05216 | 16.0264 | 0.862111 | Corundum (Cr-doped), syn(2, 1, 4) |
| 18 | 68.0166 | 1.37719 | 1.05216 | 19.1464 | 0.868356 | Corundum (Cr-doped), syn(3, 0, 0) |
| 19 | 70.64(17) | 1.332(3) | 1.1(2) | 11.2(17) | 1.1(10) | Aluminum Neodymium Oxide(2, 3, 0), Corundum (Cr-doped), syn |
| 20 | 72.40(8) | 1.3042(9) | 0.38(4) | 18(2) | 0.4(2) | Neodymium Zirconium Oxide(4, 0, 0) |

Similar to what is shown above with respect to FIGS. 8A-B, embodiments of this material have a three phase structure including a primary neodymium zirconium oxide phase, a secondary aluminum neodymium oxide phase, and a tertiary corundum phase.

Figure 10A:
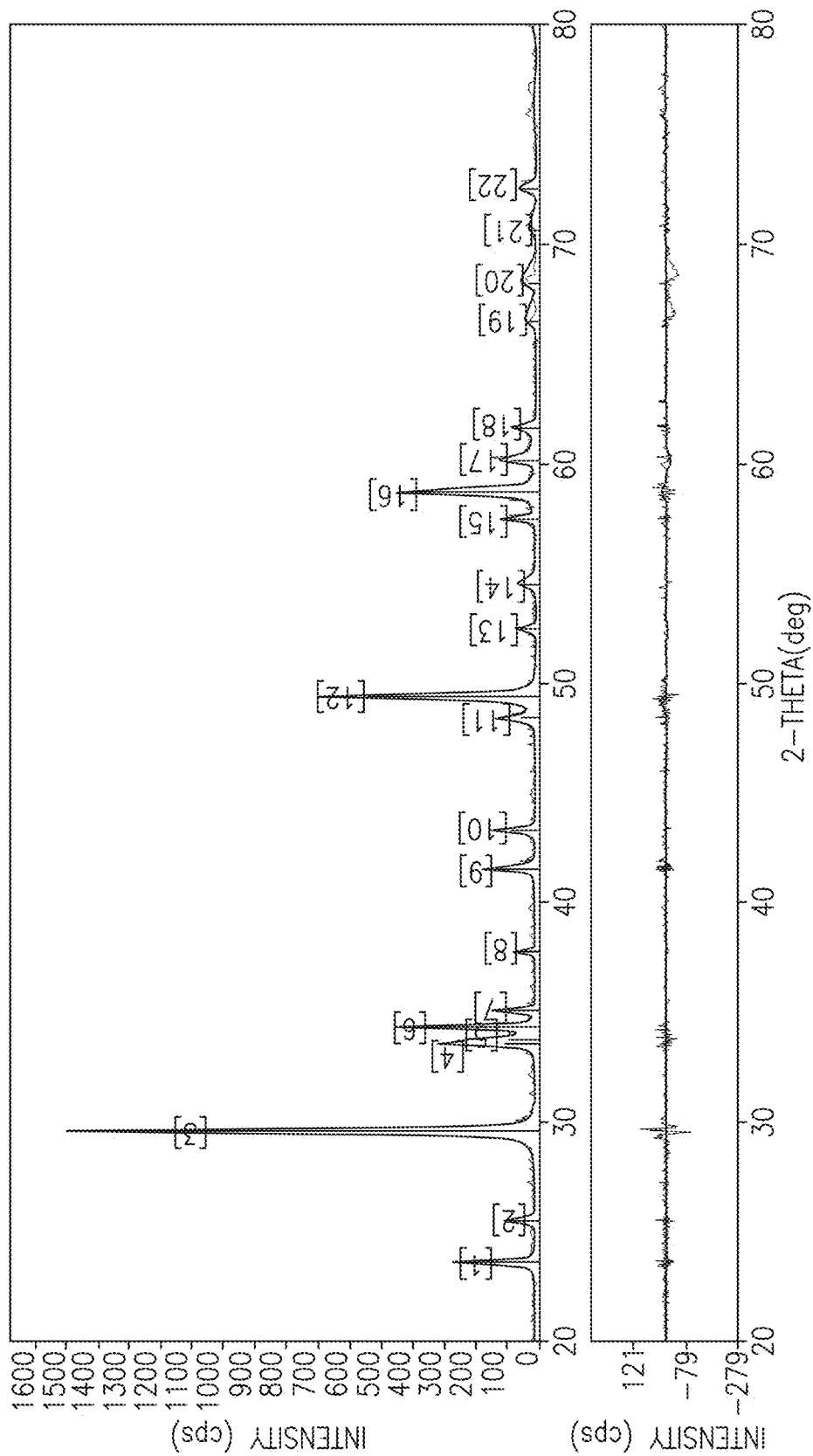
Figure 10B:
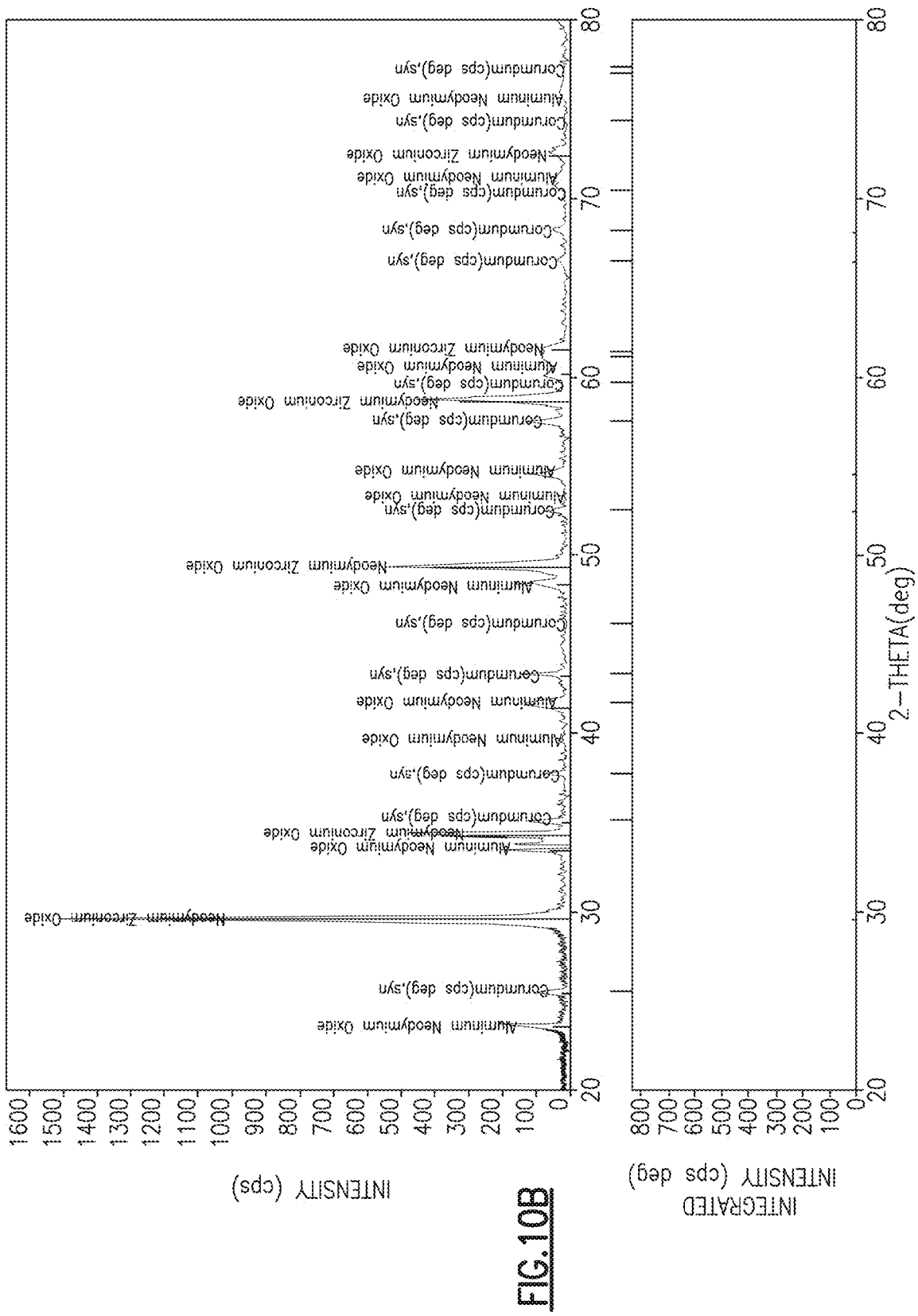

The next figure set, FIGS. 10A-B, show another embodiment of the disclosed ceramic material as detailed in Table III.

TABLE III

Experimental data for Example 3

| No. | 2-theta (deg) | d (ang.) | FWHM (deg) | Int. I (cps deg) | Int. W (deg) | Phase data name |
|---|---|---|---|---|---|---|
| 1 | 23.63(2) | 3.762(3) | 0.179(19) | 42.1(15) | 0.25(5) | Aluminum Neodymium Oxide(0, 1, 2) |
| 2 | 25.48(4) | 3.492(5) | 0.22(3) | 15.1(13) | 0.28(12) | Corundum, syn(0, 1, 2) |
| 3 | 29.623(8) | 3.0131(8) | 0.200(9) | 298(4) | 0.28(2) | Neodymium Zirconium Oxide(1, 1, 1) |
| 4 | 33.568(18) | 2.6675(14) | 0.18(3) | 58(7) | 0.26(9) | Aluminum Neodymium Oxide(1, 1, 0) |
| 5 | 33.759(16) | 2.6528(12) | 0.13(3) | 26(7) | 0.18(10) | Aluminum Neodymium Oxide(1, 0, 4) |
| 6 | 34.348(9) | 2.6087(7) | 0.142(12) | 73.0(17) | 0.21(3) | Neodymium Zirconium Oxide(2, 0, 0) |
| 7 | 35.08(2) | 2.5557(15) | 0.169(16) | 16.0(11) | 0.18(6) | Corundum, syn(1, 0, 4) |
| 8 | 37.7356 | 2.38193 | 0.168879 | 7.93516 | 0.142845 | Corundum, syn(1, 1, 0) |
| 9 | 41.50(2) | 2.1742(10) | 0.15(3) | 32.1(17) | 0.23(6) | Aluminum Neodymium Oxide(2, 0, 2), Corundum, syn(0, 0, 6) |
| 10 | 43.280(17) | 2.0888(8) | 0.15(2) | 24.6(12) | 021(6) | Corundum, syn(1, 1, 3) |
| 11 | 48.42(3) | 1.8782(11) | 0.26(3) | 25.0(16) | 0.31(10) | Aluminum Neodymium Oxide(0, 2, 4) |
| 12 | 49.391(5) | 1.84368(17) | 0.177(10) | 152(2) | 0.27(3) | Neodymium Zirconium Oxide(2, 2, 0) |
| 13 | 52.509(17) | 1.7413(5) | 0.14(3) | 11.4(9) | 0.19(8) | Corundum, syn(0, 2, 4) |
| 14 | 54.48(7) | 1.6830(19) | 0.42(7) | 19.1(12) | 0.5(2) | Aluminum Neodymium Oxide(1, 2, 2) |
| 15 | 57.434(16) | 1.6031(4) | 0.148(16) | 15.8(13) | 0.17(6) | Corundum, syn(1, 1, 6) |
| 16 | 58.698(12) | 1.5716(3) | 0.216(13) | 107(2) | 0.28(4) | Neodymium Zirconium Oxide(3, 1, 1) |
| 17 | 60.11(3) | 1.5380(6) | 0.25(4) | 33.7(17) | 0.37(11) | Aluminum Neodymium Oxide(3, 0, 0) |
| 18 | 61.63(3) | 1.5036(7) | 0.27(5) | 19.5(14) | 0.37(15) | Neodymium Zirconium Oxide(2, 2, 2) |
| 19 | 66.45 | 1.40581 | 0.802189 | 21.3455 | 0.812670 | Corundum, syn(2, 1, 4) |
| 20 | 68.1458 | 1.37489 | 0.802189 | 29.418 | 0.818947 | Corundum, syn(3, 0, 0) |
| 21 | 70.60(10) | 1.3329(16) | 0.80(13) | 13.2(18) | 0.9(7) | Aluminum Neodymium Oxide(2, 2, 0), Corundum, syn(1, 2, 5) |
| 22 | 72.50(3) | 1.3027(5) | 0.24(4) | 15.7(14) | 0.30(13) | Neodymium Zirconium Oxide(4, 0, 0) |

For this material, there is a primary phase of neodymium zirconium oxide, a secondary phase of aluminum neodymium oxide, and a tertiary phase of corundum, though there is no chromium doping.

Next is the composition tested and shown in FIGS. 11A-B and the details are in the below Table IV.

TABLE IV

Experimental data for Example 4

| No. | 2-theta (deg) | d (ang.) | FWHM (deg) | Int. I (cps deg) | Int. W (deg) | Phase data name |
|---|---|---|---|---|---|---|
| 1 | 23.68(3) | 3.757(5) | 0.25(3) | 17.2(13) | 0.30(12) | Neodymium Aluminum Oxide(0, 1, 2) |
| 2 | 25.5119 | 3.48861 | 0.252198 | 6.53355 | 0.205956 | Corundum, syn(0, 1, 2) |
| 3 | 29.650(4) | 3.0105(4) | 0.239(6) | 433(6) | 0.32(2) | Neodymium Aluminum Oxide(1, 1, 1) |
| 4 | 33.570(17) | 2.6673(13) | 0.30(2) | 35.4(19) | 0.40(12) | Neodymium Aluminum Oxide(1, 0, 4) |
| 5 | 34.370(9) | 2.6070(7) | 0.151(9) | 105(2) | 0.21(3) | Neodymium Zirconium Oxide(2, 0, 0) |
| 6 | 35.13(2) | 2.5521(15) | 0.13(2) | 9.3(12) | 0.17(8) | Corundum, syn(1, 0, 4) |
| 7 | 41.54(2) | 2.1720(10) | 0.17(3) | 14.1(11) | 0.24(9) | Neodymium Aluminum Oxide(0, 0, 6), Corundum, syn(0, 0, 6) |
| 8 | 43.29(3) | 2.0882(12) | 0.15(3) | 13.5(12) | 0.21(8) | Corundum, syn(1, 1, 3) |
| 9 | 48.4286 | 1.87805 | 0.205988 | 11.4088 | 0.238100 | Neodymium Aluminum Oxide(0, 2, 4) |
| 10 | 49.432(9) | 1.8422(3) | 0.206(11) | 217(4) | 0.30(3) | Neodymium Zirconium Oxide(2, 2, 0) |
| 11 | 52.5093 | 1.74128 | 0.344595 | 7.67584 | 0.333984 | Corundum, syn(0, 2, 4) |
| 12 | 54.45(7) | 1.684(2) | 0.34(6) | 7.1(13) | 0.4(3) | Neodymium Aluminum Oxide(1, 1, 6) |
| 13 | 57.44(5) | 1.6031(12) | 0.31(6) | 11.4(11) | 0.4(2) | Corundum, syn(1, 1, 6) |
| 14 | 58.719(9) | 1.5711(2) | 0.223(10) | 162(3) | 0.31(4) | Neodymium Zirconium Oxide(3, 1, 1) |
| 15 | 60.16(8) | 1.5368(18) | 0.32(9) | 16.2(15) | 0.5(2) | Neodymium Aluminum Oxide(0, 1, 8) |
| 16 | 61.623(18) | 1.5038(4) | 0.32(3) | 31.4(14) | 0.41(13) | Neodymium Zirconium Oxide(2, 2, 2) |
| 17 | 72.518(19) | 1.3024(3) | 0.22(2) | 21.9(12) | 0.28(9) | Neodymium Zirconium Oxide(4, 0, 0) |

Figure 11A:
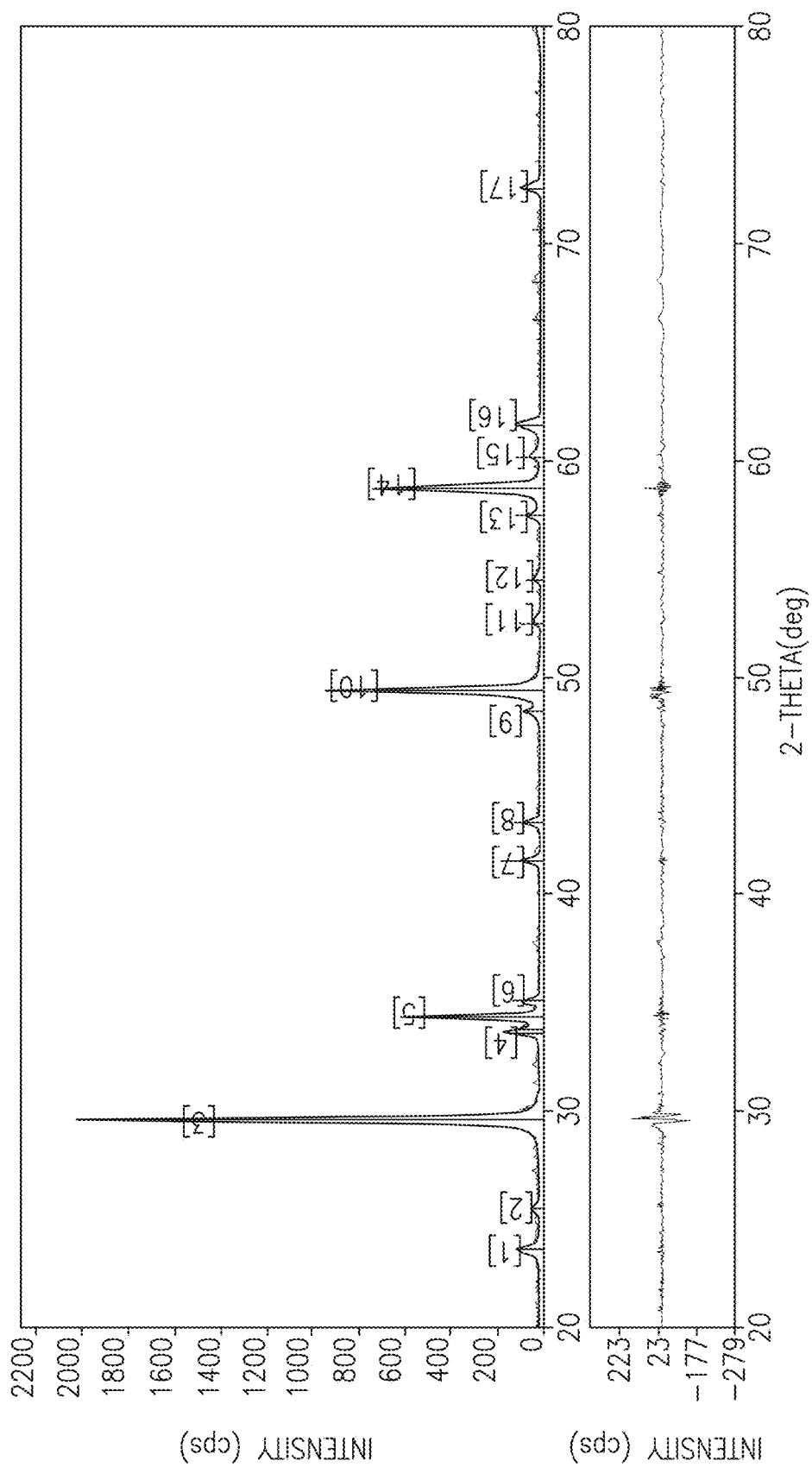
Figure 11B:
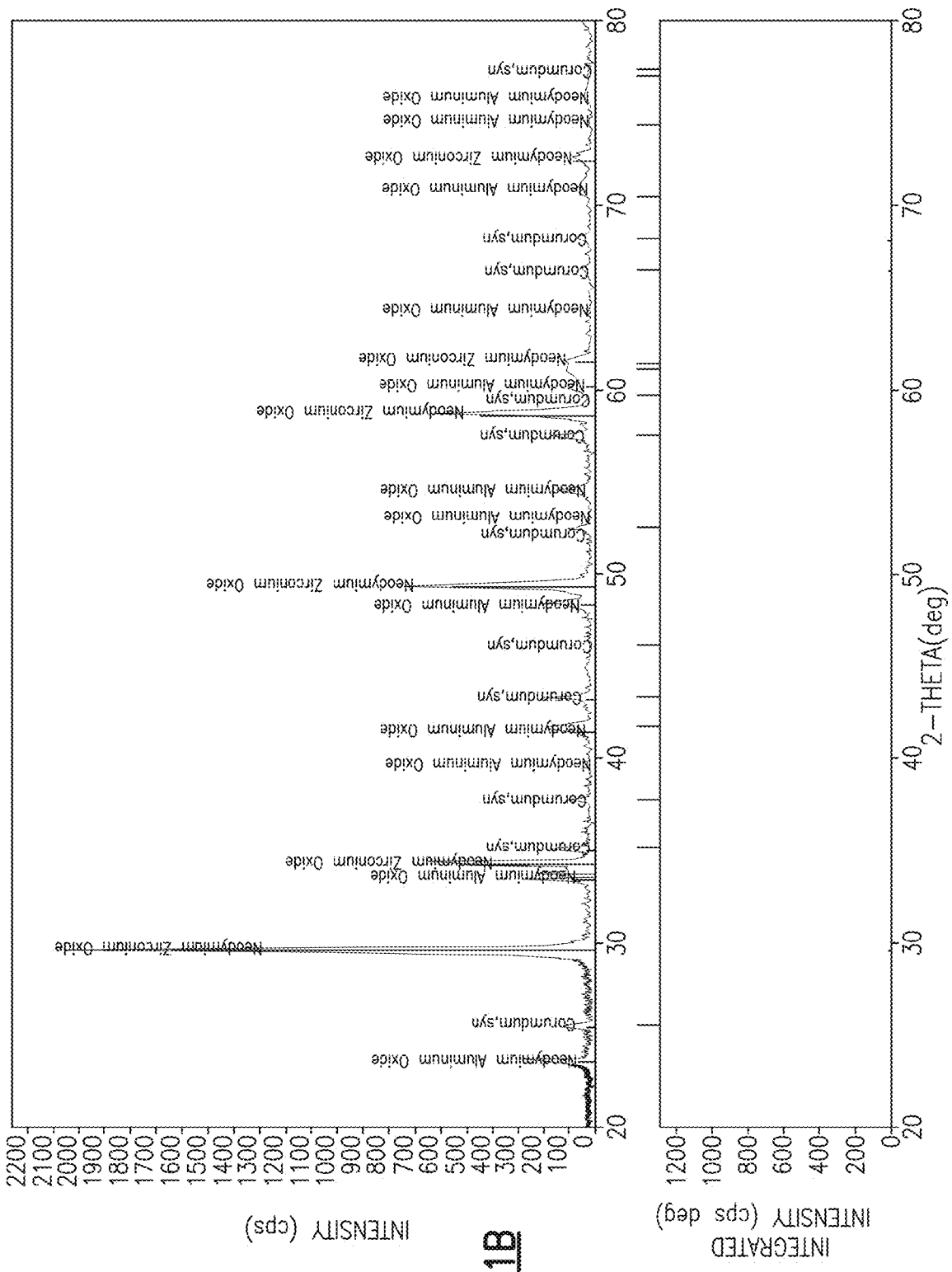

The material tested for FIGS. 11A-B have the same three phases as shown in FIGS. 10A-B, which is the primary neodymium zirconium oxide phase, a secondary aluminum neodymium oxide phase, and a tertiary corundum phase.

Figure 12A:
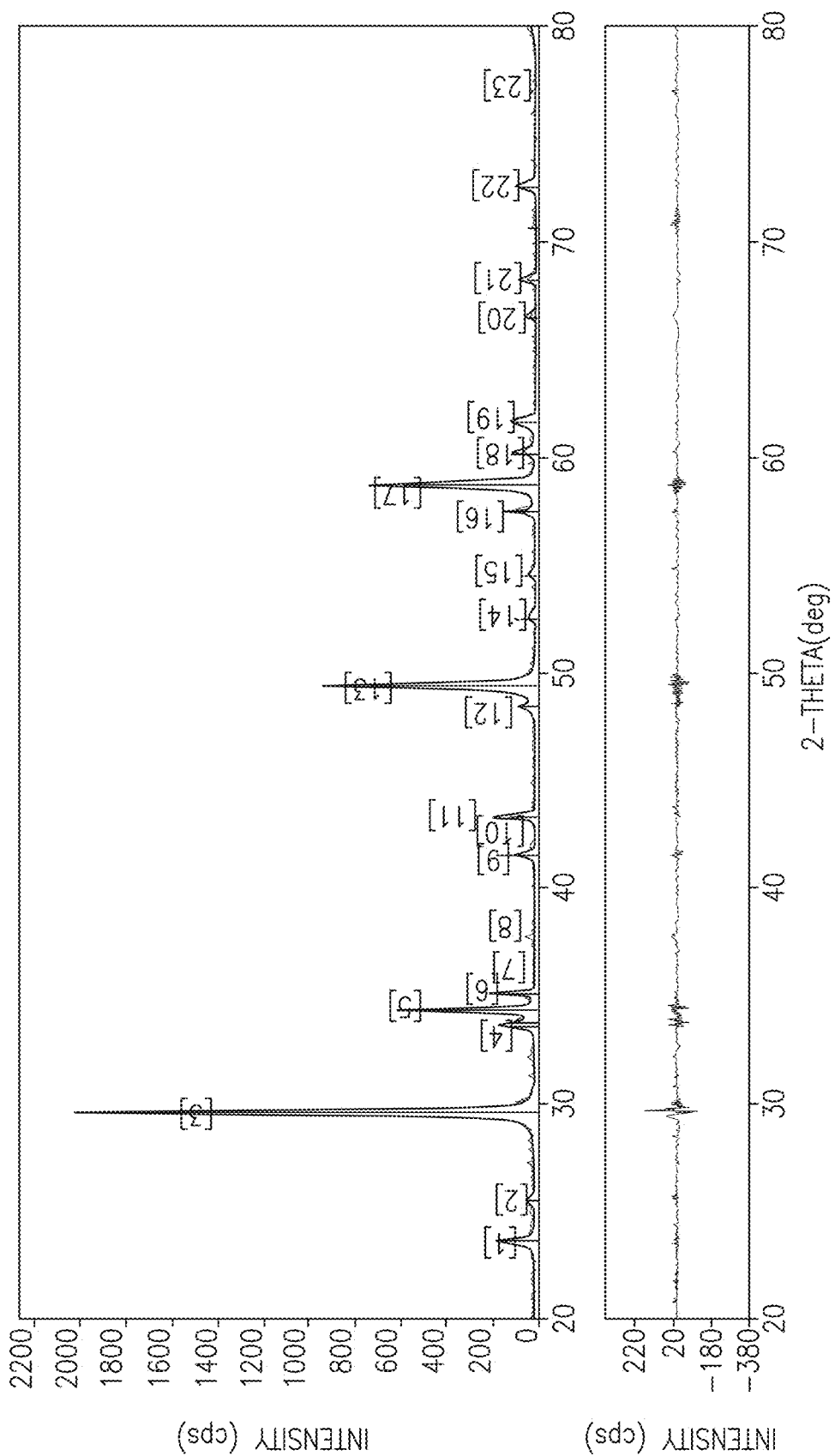
Figure 12B:
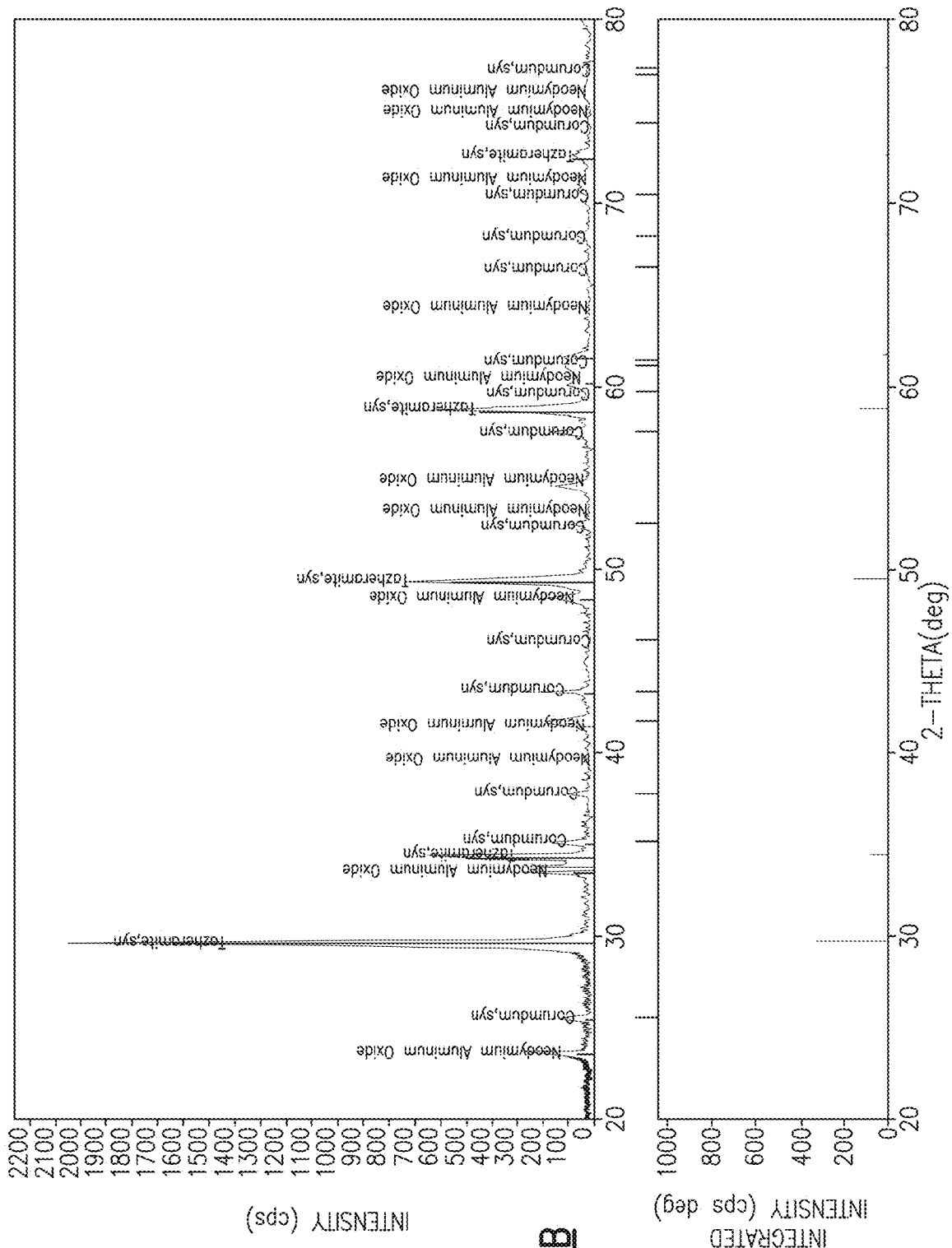

FIGS. 12A-B illustrate another embodiment of a ceramic material and the x-ray diffraction results are shown in Table V below.

TABLE V

Experimental data for Example 5

| No. | 2-theta (deg) | d (ang.) | FWHM (deg) | Int. I (cps deg) | Int. W (deg) | Phase data name |
|---|---|---|---|---|---|---|
| 1 | 23.70(2) | 3.751(3) | 0.13(3) | 32.0(15) | 0.21(5) | Neodymium Aluminum Oxide(0, 1, 2) |
| 2 | 25.608(15) | 3.476(2) | 0.14(2) | 15.2(10) | 0.19(6) | Corundum, syn(0, 1, 2) |
| 3 | 29.703(8) | 3.0052(8) | 0.178(8) | 354(5) | 0.256(19) | Tazheranite, syn(1, 1, 1) |
| 4 | 33.642(15) | 2.6618(11) | 0.31(2) | 68(3) | 0.45(11) | Neodymium Aluminum Oxide(1, 0, 4) |
| 5 | 34.420(6) | 2.6034(5) | 0.108(8) | 85(3) | 0.16(2) | Tazheranite, syn(2, 0, 0) |
| 6 | 35.155(7) | 2.5507(5) | 0.098(10) | 21.8(11) | 0.13(3) | Corundum, syn(1, 0, 4) |
| 7 | 36.2413 | 2.47664 | 0.098091 | 2.20905 | 0.119583 | Unknown |
| 8 | 37.8035 | 2.3778 | 0.098091 | 5.46064 | 0.120318 | Corundum, syn(1, 1, 0) |
| 9 | 41.569(14) | 2.1707(7) | 0.152(18) | 23.1(14) | 0.24(7) | Corundum, syn(0, 0, 6) |
| 10 | 42.83(2) | 2.1096(9) | 0.12(4) | 3.0(7) | 0.16(14) | Unknown |
| 11 | 43.376(9) | 2.0844(4) | 0.119(12) | 27.0(11) | 0.17(4) | Corundum, syn(1, 1, 3) |
| 12 | 48.51(3) | 1.8751(12) | 0.25(4) | 17.5(14) | 0.29(12) | Neodymium Aluminum Oxide(0, 2, 4) |
| 13 | 49.463(7) | 1.8412(3) | 0.186(9) | 174(2) | 0.27(3) | Tazheranite, syn(2, 2, 0) |
| 14 | 52.59(3) | 1.7389(9) | 0.17(4) | 11.8(11) | 0.24(11) | Corundum, syn(0, 2, 4) |
| 15 | 54.49(6) | 1.6826(17) | 0.46(4) | 12.4(9) | 0.5(2) | Neodymium Aluminum Oxide(1, 1, 6) |
| 16 | 57.498(12) | 1.6015(3) | 0.122(12) | 20.8(12) | 0.15(4) | Corundum, syn(1, 1, 6) |
| 17 | 58.761(8) | 1.57006(19) | 0.186(9) | 129(3) | 0.24(3) | Tazheranite, syn(3, 1, 1) |
| 18 | 60.25(4) | 1.5347(8) | 0.25(5) | 20.8(15) | 0.33(13) | Unknown |
| 19 | 61.658(16) | 1.5030(4) | 0.22(2) | 26.0(12) | 0.32(10) | Tazheranite, syn(2, 2, 2) |
| 20 | 68.55(3) | 1.4039(5) | 0.15(3) | 8.9(9) | 0.20(9) | Corundum, syn(2, 1, 4) |
| 21 | 68.23(2) | 1.3734(3) | 0.19(2) | 13.9(11) | 0.21(8) | Corundum, syn(3, 0, 0) |
| 22 | 72.55(2) | 1.3018(4) | 0.18(2) | 16.3(13) | 0.23(8) | Tazheranite, syn(4, 0, 0) |
| 23 | 77.3(2) | 1.233(3) | 1.3(2) | 10(2) | 1.4(15) | Corundum, syn(1, 0, 10), Neodymium Aluminum Oxide(3, 1, 2) |

The material shown in FIGS. 12A-B have a slightly different primary phase than the previous examples. As shown, the primary phase is Tazheranite, which as the formula $CaTiZr_2O_8$. However, this is essentially a form of zirconia, making the primary phase similar to the previous examples. Further, this example material has a secondary phase of neodymium aluminum oxide and a tertiary phase of corundum.

Figure 13B:
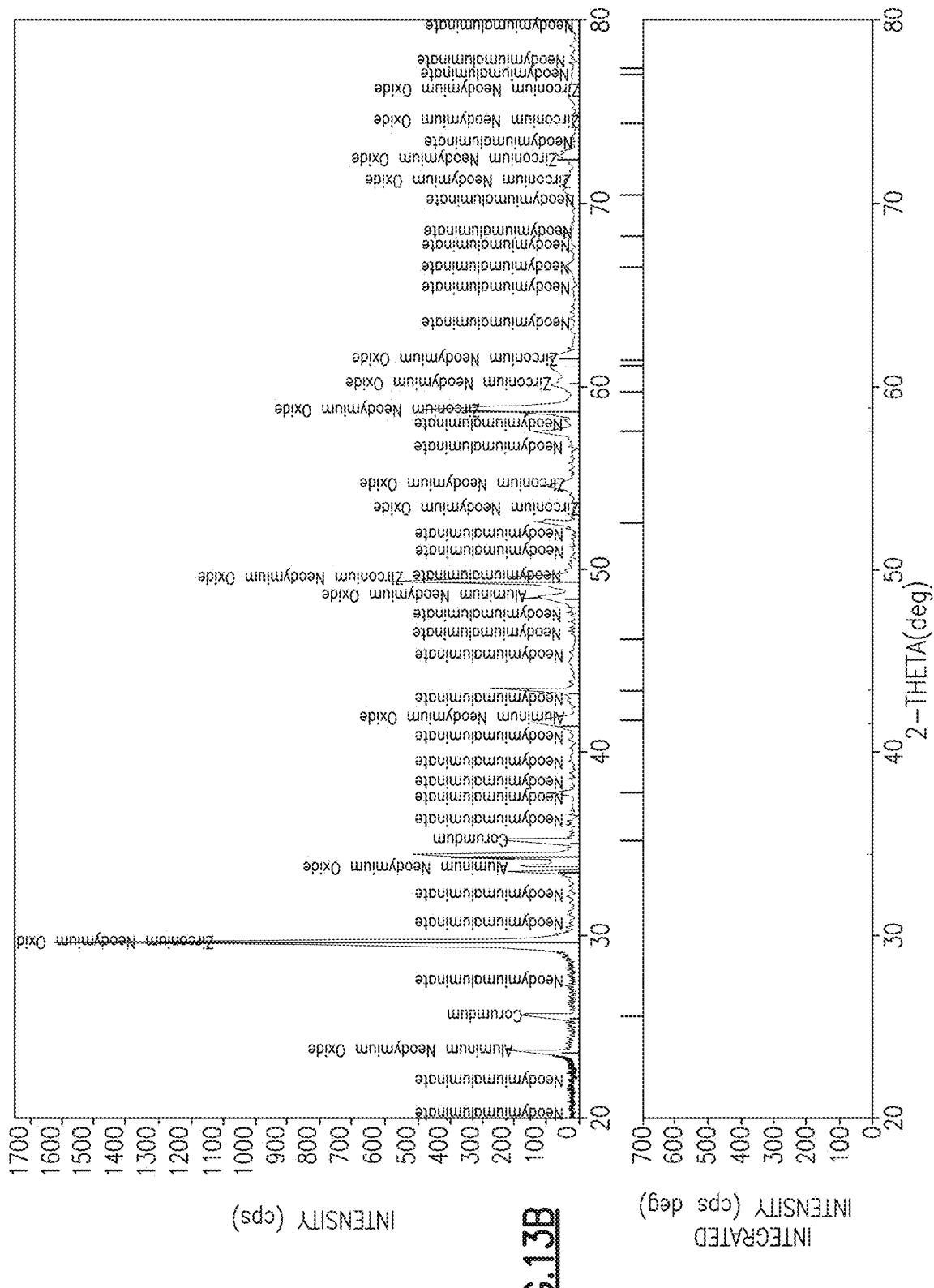

FIGS. 13A-B illustrate an additional embodiment of the disclosure material with Table VI showing the resulting data.

TABLE VI

Experimental data for Example 6

| No. | 2-theta (deg) | d (ang.) | FWHM (deg) | Int. I (cps deg) | Int. W (deg) | Phase data name |
|---|---|---|---|---|---|---|
| 1 | 23.690(17) | 3.753(3) | 0.178(18) | 43.3(19) | 0.22(5) | Aluminum Neodymium Oxide(0, 1, 2) |
| 2 | 25.572(13) | 3.4806(18) | 0.113(18) | 30.1(11) | 0.17(4) | Corundum(0, 1, 2) |
| 3 | 29.663(7) | 3.0092(7) | 0.152(7) | 250(3) | 0.222(18) | Zirconium Neodymium Oxide(1, 1, 1) |
| 4 | 32.3186 | 2.76772 | 0.137107 | 2.55567 | 0.170039 | neodymium aluminate(1, 1, 0) |
| 5 | 33.630(11) | 2.6627(9) | 0.14(2) | 52(7) | 0.20(7) | Aluminum Neodymium Oxide(1, 1, 0) |
| 6 | 33.788(14) | 2.6507(10) | 0.17(2) | 42(7) | 0.25(10) | Aluminum Neodymium Oxide(1, 0, 4) |
| 7 | 34.414(7) | 2.6038(5) | 0.118(11) | 61(2) | 0.18(3) | Zirconium Neodymium Oxide(2, 0, 0) |
| 8 | 35.149(8) | 2.5511(6) | 0.104(11) | 41.3(15) | 0.15(3) | Corundum(1, 0, 4) |
| 9 | 36.2478 | 2.47621 | 0.104267 | 1.07825 | 0.130950 | neodymium aluminate(1, 1, 4) |
| 10 | 37.776(15) | 2.3795(9) | 0.110(18) | 18.3(11) | 0.16(5) | Corundum(1, 1, 0), neodymium aluminate(2, 0, 1) |
| 11 | 41.542(17) | 2.1720(8) | 0.18(2) | 31.7(16) | 0.26(7) | Corundum(0, 0, 6), Aluminum Neodymium Oxide(2, 0, 2) |
| 12 | 42.9381 | 2.1046 | 0.117765 | 4.15964 | 0.150299 | neodymium aluminate(2, 0, 5) |
| 13 | 43.353(10) | 2.0854(5) | 0.118(13) | 53(2) | 0.17(3) | Corundum(1, 1, 3) |
| 14 | 45.0619 | 2.01022 | 0.117765 | 2.75081 | 0.151626 | neodymium aluminate(2, 0, 6) |
| 15 | 48.44(2) | 1.8776(8) | 0.19(2) | 30.7(13) | 0.26(7) | Aluminum Neodymium Oxide(0, 2, 4) |
| 16 | 49.423(8) | 1.8426(3) | 0.179(9) | 120(2) | 0.25(3) | Zirconium Neodymium Oxide (2, 2, 0), neodymium aluminate(0, 0, |
| 17 | 52.537(12) | 1.7405(4) | 0.108(13) | 23.1(10) | 0.16(4) | Corundum(0, 2, 4) |
| 18 | 54.46(5) | 1.6834(15) | 0.45(4) | 19.0(15) | 0.5(2) | Aluminum Neodymium Oxide(1, 2, 2), neodymium aluminate(2, 1, |
| 19 | 57.489(5) | 1.60172(12) | 0.123(6) | 45.4(13) | 0.17(3) | Corundum(1, 1, 6), neodymium aluminate(1, 0, 13) |
| 20 | 58.723(10) | 1.5710(2) | 0.199(10) | 88(2) | 0.26(4) | Zirconium Neodymium Oxide(3, 1, 1), neodymium aluminate(2, 1, |
| 21 | 60.21(3) | 1.5358(7) | 0.25(4) | 37.3(18) | 0.36(10) | Aluminum Neodymium Oxide(3, 0, 0), neodymium aluminate(3, 0, |
| 22 | 61.60(4) | 1.5043(8) | 0.30(3) | 18.0(13) | 0.39(16) | Zirconium Neodymium Oxide(2, 2, 2), neodymium aluminate(3, 0, |
| 23 | 66.522(10) | 1.40445(18) | 0.128(12) | 20.1(12) | 0.18(5) | Corundum(2, 1, 4) |
| 24 | 67.30(10) | 1.3902(18) | 0.33(16) | 6.7(12) | 0.5(5) | neodymium aluminate(2, 2, 0) |
| 25 | 68.210(11) | 1.3738(2) | 0.119(11) | 25.8(12) | 0.16(4) | Corundum(3, 0, 0) |
| 26 | 70.93(13) | 1.328(2) | 0.72(11) | 15.4(18) | 0.9(6) | Aluminum Neodymium Oxide(2, 2, 0), neodymium aluminate(3, 1, |
| 27 | 72.54(2) | 1.3021(3) | 0.20(2) | 9.1(9) | 0.22(10) | Zirconium Neodymium Oxide(4, 0, 0) |
| 28 | 75.9646 | 1.25164 | 0.232492 | 4.41279 | 0.359952 | Aluminum Neodymium Oxide(3, 1, 2), neodymium aluminate(2, 0, |
| 29 | 76.83(4) | 1.2397(5) | 0.23(7) | 11.3(12) | 0.4(2) | Corundum(1, 0, 10), neodymium aluminate(2, 2, 8) |

As shown, this material has a primary phase of zirconium neodymium oxide, a secondary phase of aluminum neodymium oxide, and a tertiary phase of corundum.

Applications

Figure 14B:
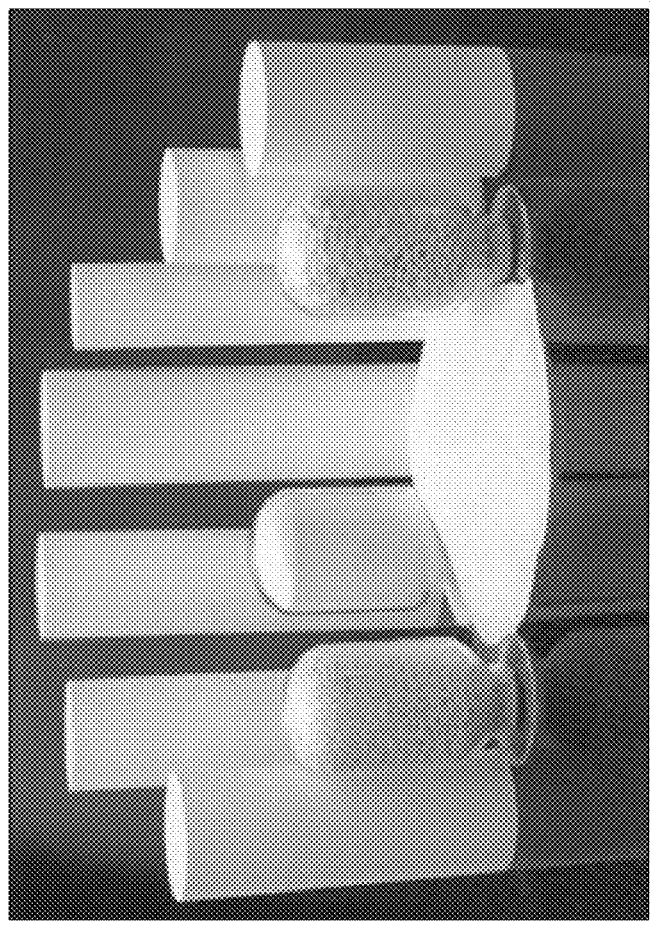
FIGS. 14A and 14B illustrate example applications suitable for embodiments of the disclosed ceramic compositions.
Figure 14A:
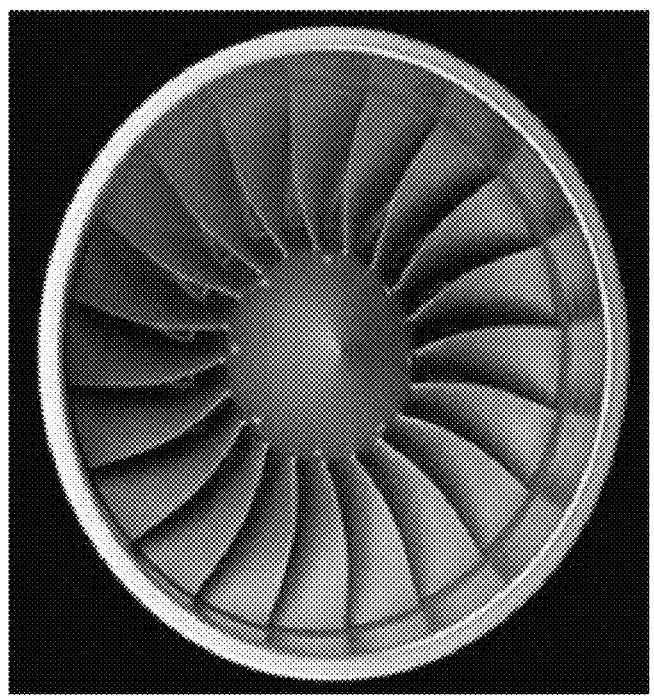

Embodiments of the multi-phase ceramic discussed herein may be used in thermal management applications. In one example, a ceramic having one or more features as described herein may be employed in a thermal barrier coating deposited upon a substrate (e.g., a metallic surface) employed in an elevated temperature environment. The coating may serve to insulate the substrate from high heat load, allowing the substrate to operate at higher temperatures than would be possible without such a coating. For example, thermal barrier coatings may be deposited upon hot zone components in gas turbine engines (e.g., gas-turbine powered electrical generators, turbojet and turbofan engines, airplane turbines, etc.). Examples of hot zone components may include, but are not limited to, combustor liners, combustor shrouds, and turbine blades. An example of a turbojet engine is illustrated in FIG. 14A. In other embodiments, thermal barrier coatings may be applied to components employed in automotive applications such as engine exhaust system components (e.g., exhaust manifolds, turbocharger casings, exhaust headers, downpipes, tailpipes, etc.).

In some embodiments, one or more of the disclosed ceramic compositions may be employed in ceramic applications where improved toughness is desired. In some implementations, such ceramic compositions may be prepared using processing operations known in the art including, but not limited to, milling, batching, mixing, forming, drying, firing, etc. In some implementations, objects having the ceramic compositions may be formed by mechanisms including, but not limited to, extrusion, pressing, casting, etc. Examples of formed ceramic objects are illustrated in FIG. 14B.

Processing

Figure 15:
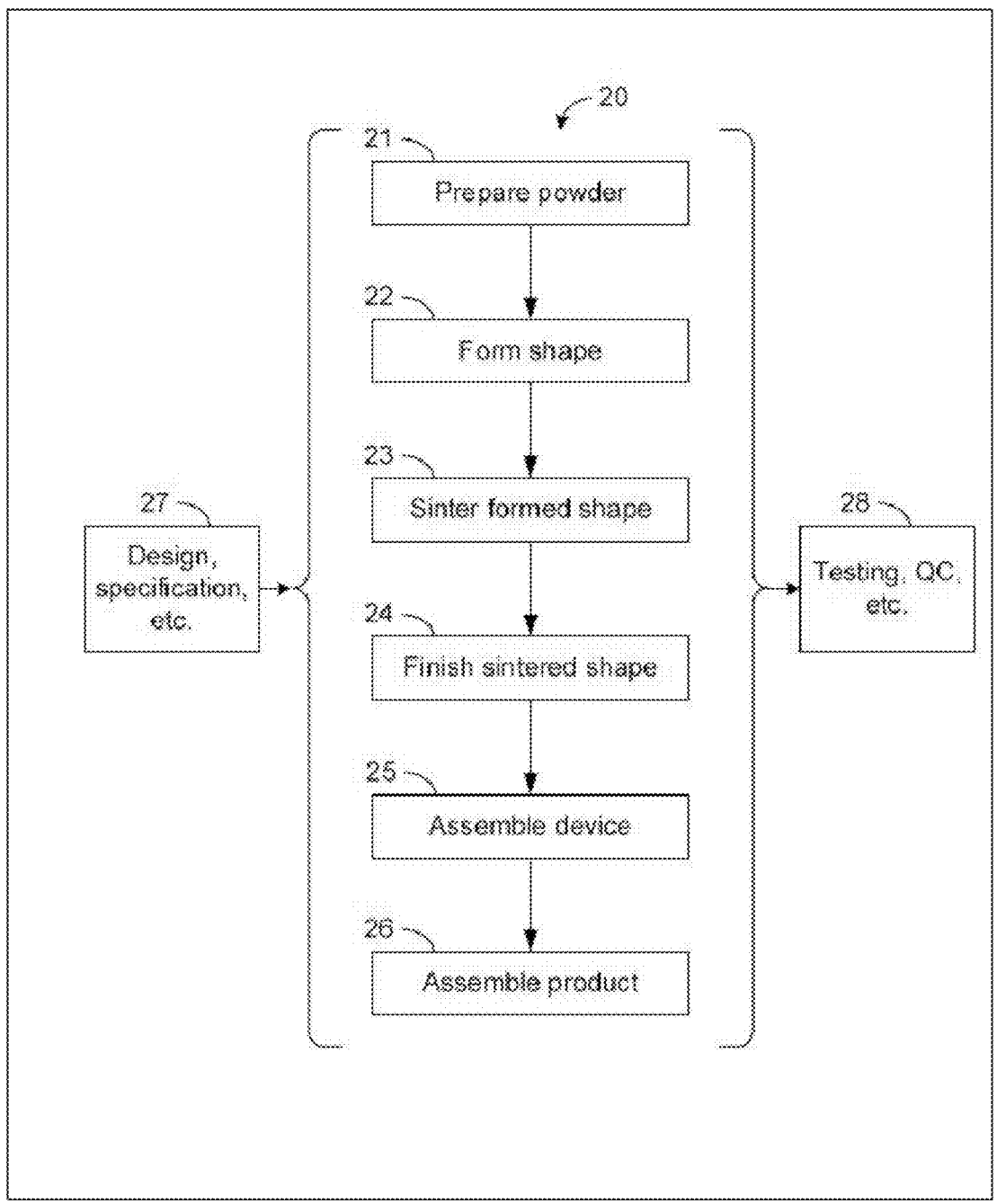
FIG. 15 shows an example process that can be implemented to fabricate ceramic materials.

FIG. 15 shows a process 20 that can be implemented to fabricate a ceramic material having one or more properties described herein. In block 21, powder can be prepared. In some implementations, such powder preparation can include heating to yield one or more desired results as described herein.

In block 22, a shaped object can be formed from the prepared powder. In block 23, the formed object can be sintered in implementations where sintering of the formed object is desired. In some implementations, the prepared powder can be used without being formed into shaped objects. In some implementations, the prepared powder can be formed into shaped objects; but such shaped objects may not be sintered. In block 24, the sintered object can be finished to yield a finished ceramic object having one or more desirable properties.

In implementations where the finished ceramic object or material is part of a device, the device can be assembled or the material can be applied to the device in block 25. In implementations where the device or the finished ceramic object is part of a product, the product that benefits from one or more features as described herein can be assembled in block 26.

FIG. 15 further shows that some or all of the steps of the example process 20 can be based on a design, specification, etc. Similarly, some or all of the steps can include or be subjected to testing, quality control, etc.

Figure 16:
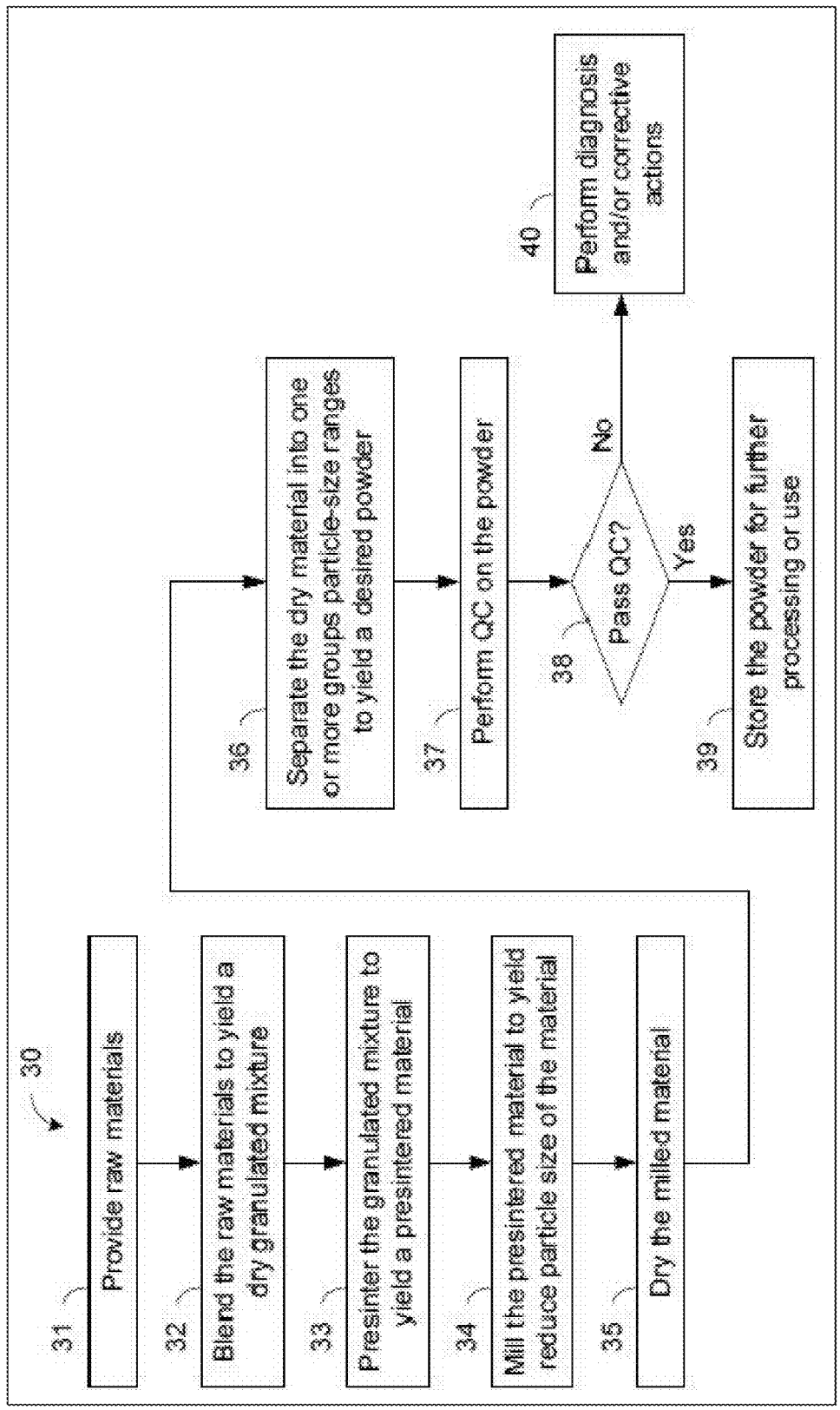
FIG. 16 shows an example process that can be implemented to fabricate powder having one or more features as described herein.

FIG. 16 shows a process 30 that can be implemented to prepare a powder having one or more features described herein. Such a powder can be used as is, or can be formed into desired shapes as described herein. In block 31 raw materials can be provided. Such raw materials can be selected to yield one or more desired properties of the prepared powder, an object formed from such a powder, and/or a ceramic object resulting from sintering of such a formed object.

In block 32, the raw materials can be blended to yield a dry granulated mixture. Such blending can be achieved in a number of ways. For example, an Eirich blending method or a Cowles blending method can be utilized.

In block 33, the granulated mixture can be pre-sintered to yield a pre-sintered material. For the purpose of description, it will be understood that such pre-sintering can include implementations where such pre-sintered material will be formed into shapes for another sintering process. In implementations where such pre-sintered material will not be formed into shapes, or where shapes formed from such pre-sintered material will not undergo another sintering process, the pre-sintering of the granulated mixture can be configured so that the resulting material has one or more desired properties as described herein.

In block 34, the pre-sintered material can be milled to yield reduced particle size of the pre-sintered material. Such a milling process can yield refined and regulated particles from the pre-sintered material.

In block 35, the milled material can be dried. In some implementations, such a drying process can include a spray drying process. In some implementations, the spray-drying process can be used to produce free-flowing powder suitable for a forming process. Milled material as described herein can be mixed with a binder material in a tank to form a slurry. The resulting mixture can be poured through a fine meshed screen to separate oversized particles from usable particles. Next, the screened slurry can be pumped into a dryer chamber through a pipe and a nozzle at or near the bottom of the chamber, creating a fountain-like spray. Formation of flowable powder can occur through the action of downward-flowing heated air meeting the upward spray of the slurry in the dryer chamber and forming small spherical dry particles. More coarse particles can drop to a lower collection chamber, and finer particles can be collected in an upper cyclone collection chamber. In some implementations, size of the spray dried particles can be adjusted by exchanging the orifice size of the nozzle and controlling the feed-air flow ratio. After spray-drying in the foregoing manner, the dried powder can be collected for screening.

In block 36, the spray-dried powder material can be separated into one or more groups of particle-size ranges to yield one or more powders having desired ranges of particle sizes. In some implementations, such a separation process can be achieved by a separator such as a vibro-energy separator. Separation of spray-dried material into different groups of comparable sizes in the foregoing manner can allow collection of particles having sizes in a desired range.

In block 37, a quality-control (QC) test can be performed on a selected group of spray-dried powder (e.g., a group having particle sizes in a desired range). If the QC test is passed in a decision block 38, the process 30 can proceed to block 39 where the powder can be stored for further processing or use. If the QC test is failed, the process 30 can proceed to block 40 where one or more diagnosis and/or corrective actions can be performed.

Figure 17:
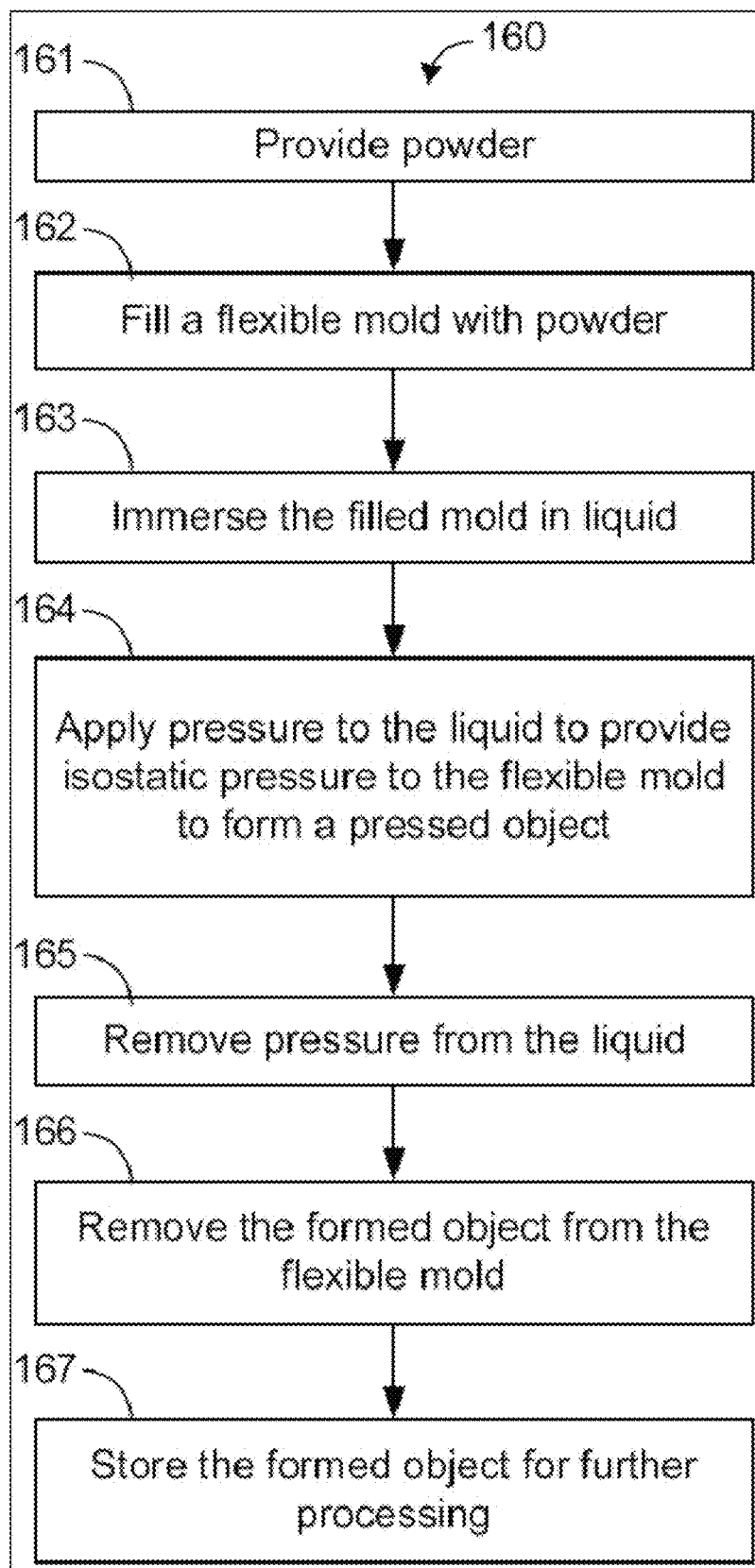
FIG. 17 shows an example process that can be implemented to form an ingot from the fabricated powder.

In some implementations, materials having one or more features as described herein can be formed into ingots for use during end applications such as thermal barrier coating as shown in FIG. 17. In some embodiments, such ingots can be formed by an iso-press process 160. In block 161, powder can be provided. In some implementations, such powder can be prepared as described herein. In block 162, a flexible mold can be filled with the powder. In block 163, the filled mold can be immersed in fluid. In some implementations, such a fluid can include generally incompressible liquids such as water. In process 164, pressure can be applied to the liquid to provide isostatic pressure to the flexible mold to thereby form a pressed object from the powder therein. In block 165, pressure can be removed from the liquid. In block 166, the formed object can be removed from the flexible mold. In block 167, the formed object can be stored for further processing or use.

The material can be applied as a coating in, for example, plasma spraying or electron beam physical vapor deposition (EBPVD).

From the foregoing description, it will be appreciated that inventive products and approaches for thermal barrier coatings are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A ceramic material resistant to fracturing and corrosion, the ceramic material comprising:
   60 to 80 wt. % of a first phase, the first phase being tetragonally stabilized zirconia or hafnia;
   10 to 20 wt. % of a second phase, the second phase being an aluminum neodymium oxide magnetoplumbite structure; and
   5 to 10 wt. % of a third phase, the third phase being alumina.

2. The ceramic material of claim 1 wherein the third phase is configured to react with molten silicates.

3. The ceramic material of claim 1 wherein the ceramic material is calcium, magnesium, and aluminum silicate corrosion resistant.

4. The ceramic material of claim 1 wherein the stabilized zirconia or hafnia is stabilized by yttrium.

5. The ceramic material of claim 1 wherein the ceramic material further includes apatite.

6. The ceramic material of claim 1 further including chromium in the ceramic material.

7. The ceramic material of claim 1 wherein the alumina is not layered on the first phase or the second phase.

8. A ceramic material resistant to fracturing and corrosion, the ceramic material comprising three separate phases, a first phase of the three separate phases having a stable cubic fluorite phase, a stable tetragonal phase, or a metastable tetragonal phase, the first phase being in the ceramic material and having a wt. % greater than 0%, 60 to 70 wt. % of a second phase of the three separate phases having substantially no reaction with the first phase, and a third phase of the three separate phasing being $NdAlO_3$ having a perovskite structure and having a wt. % of 10 to 20.

9. The ceramic material of claim 8 wherein the first phase is zirconium oxide.

10. The ceramic material of claim 8 wherein the first phase is hafnium oxide.

11. The ceramic material of claim 8 wherein the first phase is cerium(IV) oxide.

12. The ceramic material of claim 8 wherein the second phase is a magnetoplumbite-based aluminate phase.

13. The ceramic material of claim 8 wherein the third phase is not layered on the first phase or the second phase.

14. A ceramic material resistant to fracturing and corrosion, the ceramic material comprising:
   a zirconia phase being greater than 50-80 wt. % of the ceramic material;
   an aluminum neodymium oxide phase being 10-30 wt. % of the ceramic material, the aluminum neodymium oxide phase being a separate phase from the zirconia phase; and
   an alumina phase being 10-30 wt. % of the ceramic material, the alumina phase being a separate phase from the zirconia phase and the aluminum neodymium oxide phase, a combined total amount of the zirconia phase, the aluminum neodymium oxide phase, and the alumina phase being less than or equal to 100 wt. %.

15. The ceramic material of claim 14 wherein the alumina phase is not layered on the aluminum neodymium oxide phase or the zirconia phase.

16. The ceramic material of claim 14 wherein the ceramic material further includes chromium.

17. The ceramic material of claim 14 wherein the ceramic material is calcium, magnesium, and aluminum silicate corrosion resistant.

18. The ceramic material of claim 14 wherein the zirconia phase is tetragonally stabilized with yttrium.

19. The ceramic material of claim 14 wherein the ceramic material is further stabilized with apatite.

20. The ceramic material of claim 8 wherein the ceramic material further includes chromium.

* * * * *